US012473404B2

United States Patent
Courtemanche et al.

(10) Patent No.: US 12,473,404 B2
(45) Date of Patent: Nov. 18, 2025

(54) COMPOSITION AND METHOD FOR SILYL HYDRIDE REACTION CATALYZED BY FLUORINATED ARYLBORANE LEWIS ACIDS

(71) Applicants: Dow Silicones Corporation, Midland, MI (US); Dow Global Technologies LLC, Midland, MI (US)

(72) Inventors: Marc-Andre Courtemanche, Midland, MI (US); Anne-Catherine Bedard, Midland, MI (US); Heather Spinney, Midland, MI (US); David Wilson, Midland, MI (US); Arjun Raghuraman, Freeport, TX (US); Sukrit Mukhopadhyay, Midland, MI (US); Andrew Shah, Collegeville, PA (US); David Devore, Midland, MI (US); David Laitar, Midland, MI (US); Jordan Reddel, Midland, MI (US); Shuqi Lai, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 526 days.

(21) Appl. No.: 17/915,656

(22) PCT Filed: Jun. 16, 2021

(86) PCT No.: PCT/US2021/037538
§ 371 (c)(1),
(2) Date: Sep. 29, 2022

(87) PCT Pub. No.: WO2021/262492
PCT Pub. Date: Dec. 30, 2021

(65) Prior Publication Data
US 2023/0123215 A1 Apr. 20, 2023

Related U.S. Application Data

(60) Provisional application No. 63/043,149, filed on Jun. 24, 2020.

(51) Int. Cl.
*C08G 77/12* (2006.01)
*C08G 77/08* (2006.01)
*C08G 77/44* (2006.01)

(52) U.S. Cl.
CPC ............ *C08G 77/12* (2013.01); *C08G 77/08* (2013.01); *C08G 77/44* (2013.01)

(58) Field of Classification Search
None
See application file for complete search history.

(56) References Cited

U.S. PATENT DOCUMENTS

| 3,159,601 | A | 12/1964 | Ashby et al. |
| 3,220,972 | A | 11/1965 | Lamoreaux et al. |
| 3,296,291 | A | 1/1967 | Scotia et al. |
| 3,419,593 | A | 12/1968 | Willing et al. |
| 3,516,946 | A | 6/1970 | Scotia et al. |
| 3,814,730 | A | 6/1974 | Karstedt et al. |
| 3,989,668 | A | 11/1976 | Lee et al. |
| 4,374,967 | A | 2/1983 | Brown et al. |
| 4,766,176 | A | 8/1988 | Lee et al. |
| 4,784,879 | A | 11/1988 | Lee et al. |
| 5,017,654 | A | 5/1991 | Togashi et al. |
| 5,036,117 | A | 7/1991 | Chung et al. |
| 5,175,325 | A | 12/1992 | Brown et al. |
| 5,625,023 | A | 4/1997 | Chung et al. |
| 6,586,535 | B1 | 7/2003 | Clark et al. |
| 6,624,254 | B1 | 9/2003 | Arriola et al. |
| 6,806,339 | B2 | 10/2004 | Cray et al. |
| 7,064,173 | B2 | 6/2006 | Rubinsztajn et al. |
| 8,048,819 | B2 | 11/2011 | Rubinsztajn et al. |
| 8,304,543 | B2 | 11/2012 | Jialanella et al. |
| 8,722,153 | B2 | 5/2014 | Ekeland |
| 8,933,177 | B2 | 1/2015 | Hori et al. |
| 9,035,008 | B2 | 5/2015 | Yang et al. |
| 9,156,948 | B2 | 10/2015 | Brandstadt et al. |
| 9,593,209 | B2 | 3/2017 | Dent et al. |
| 9,670,392 | B2 | 6/2017 | Larson et al. |

(Continued)

FOREIGN PATENT DOCUMENTS

EP 0556023 A1 8/1993
EP 0347895 B 11/1993

(Continued)

OTHER PUBLICATIONS

Keess, S., et al., (Direct and Transfer Hydrosilylation Reactions Catalyzed by Fully or Partially Fluorinated Triarylboranes: A Systematic Study, Organometallics 2015, 34, 790â799) (Year: 2015).*
Becke, "Density-functional thermochemistry. III. The role of exact exchange", J. Chem. Phys., 1993, 98, p. 5648.
Chojnowski, "Hydried Transfer Ring-Opening Polymerization of a Cyclic Oligomethylhydrosiloxane. Route to a Polymer of Closed Multicyclic Structure", Macromolecules 2012, vol. 45, pp. 2654-2661.
Chojnowski, "Mechanism of the B(C6F5)3-Catalyzed Reaction of Silyl Hydrides with Alkoxysilanes. Kinetic and Spectroscopic Studies", Organometallics, 2005, 24, pp. 6077-6084.
Chojnowski, "Oligomerization of Hydrosiloxanes in the Presence of Tris(pentaflurophenyl)borane", Macromolecules, 2006, 39, pp. 3802-3807.
Ditchfield, "Self-Consistent Molecular-Orbital Methods. IX. An Extended Gaussian-Type Basis for Molecular-Orbital Studies of Organic Molecules", J. Chem. Phys., 1971, vol. 54, p. 724.

(Continued)

*Primary Examiner* — Robert S Jones, Jr.
*Assistant Examiner* — Lily K Sloan
(74) *Attorney, Agent, or Firm* — Catherine U. Brown

(57) ABSTRACT

A composition includes a silyl hydride (having at least one silicon-bonded hydrogen atom per molecule) and a fluorinated triarylborane Lewis acid. In the method, the Lewis acid catalyzes reaction of silicon bonded hydrogen atoms from the silyl hydride and water, thereby forming a siloxane bond in the resulting product. The composition and method can be used to form siloxane intermediates and cured networks.

13 Claims, No Drawings

(56) References Cited

U.S. PATENT DOCUMENTS

| | | | |
|---|---|---|---|
| 11,133,504 | B2 | 9/2021 | Kawakami et al. |
| 2003/0088042 | A1 | 5/2003 | Griswold et al. |
| 2003/0139287 | A1 | 7/2003 | Deforth et al. |
| 2004/0254274 | A1 | 12/2004 | Griswold |
| 2005/0038188 | A1 | 2/2005 | Ahn et al. |
| 2006/0241271 | A1 | 10/2006 | Rubinsztajn et al. |
| 2007/0289495 | A1 | 12/2007 | Cray et al. |
| 2011/0287267 | A1 | 11/2011 | Hori et al. |
| 2013/0072733 | A1* | 3/2013 | Breuil .............. C07C 7/005 585/809 |
| 2015/0080628 | A1* | 3/2015 | Norman ........... B01J 31/143 585/513 |
| 2016/0053056 | A1 | 2/2016 | Gould et al. |
| 2016/0319081 | A1* | 11/2016 | Kumar ............. C08G 77/44 |

FOREIGN PATENT DOCUMENTS

| | | |
|---|---|---|
| WO | 0212386 A1 | 2/2002 |
| WO | 2013142956 A1 | 10/2013 |
| WO | 2019023008 A1 | 1/2019 |
| WO | 2019055740 A1 | 3/2019 |
| WO | 2019182986 A1 | 9/2019 |
| WO | 2019182993 A1 | 9/2019 |
| WO | 2020131365 A1 | 6/2020 |
| WO | 2020247334 A1 | 12/2020 |

OTHER PUBLICATIONS

Fawcett, "Rapid, Metal-Free Room Temperature Vulcanization Produces Silicone Elastomers", Polym. Sci. A Polym. Chem., 2013, 51, pp. 644-652.

Gordon, "The Isomers of Silacyclopropane", Chem. Phys. Lett. 1980, vol. 76, p. 163.

Hehre, "Self-Consistent Molecular Orbital Methods. XII. Further Extensions of Gaussian-Type Basis Sets for Use in Molecular Orbital Studies of Organic Molecules", J. Chem. Phys., 1972, vol. 56, p. 2257.

Herrington, "Novel $H_2$ activation by a tris[3,5-bis(trifluoromethyl)phenyl]borane frustrated Lewis pair", Dalton Trans., 2012, vol. 41, p. 9019.

Lee, C. et al., Abstract, Phys. Rev B 1988, 37, 785.

Miehlich, "Results Obtained with the Correlation Energy Density Functionals of Becke and Lee, Yang and Parr", Chem. Phys. Lett., 1989, vol. 157, p. 200.

Oestreich, "A unified survey of Si—H and H—H bond activation catalyzed by electron-deficient boranes", Chem. Soc. Rev., 2015, 44, pp. 2202-2220.

Piers, "Mechanistic Aspects of Bond Activation with Perfluoroarylboranes", Inorg. Chem., 2011, 50, pp. 12252-12262.

Poater, "SambVca: A Web Application for the Calculation of the Buried Volume N-Heterocyclic Carbene Ligands", Eur. J. Inorg. Chem., 2009, p. 1759.

Watson, "Colored indicators for simple direct titration of magnesium and lithium reagents", J. Organomet. Chem., 1967, vol. 9, pp. 165-168.

\* cited by examiner

COMPOSITION AND METHOD FOR SILYL HYDRIDE REACTION CATALYZED BY FLUORINATED ARYLBORANE LEWIS ACIDS

CROSS REFERENCE TO RELATED APPLICATIONS

This application is a U.S. national stage filing under 35 U.S.C. § 371 of PCT Application No. PCT/US21/037538 filed on 16 Jun. 2021, which claims the benefit of U.S. Provisional Patent Application No. 63/043,149 filed 24 Jun. 2020 under 35 U.S.C. § 119 (e). PCT Application No. PCT/US21/037538 and U.S. Provisional Patent Application No. 63/043,149 are each hereby incorporated by reference.

TECHNICAL FIELD

A composition includes a silyl hydride (having at least one silicon-bonded hydrogen atom per molecule) and a fluorinated triarylborane Lewis acid. In the method, the Lewis acid catalyzes reaction of silicon-bonded hydrogen atoms from the silyl hydride and water, thereby forming a siloxane bond in the resulting product. The composition and method can be used to form siloxane intermediates and cured networks.

BACKGROUND

The catalysts predominantly employed in the preparation of both siloxane intermediates and siloxane-cured networks from Si—H functional silanes and siloxanes are platinum-based catalysts. Due to the increasingly high cost of platinum (Pt) and other drawbacks such as yellowing of cured siloxane compositions or formation of a black precipitate over time, there is an industry need for an alternative to Pt-based catalysts. Furthermore, while Pt-based catalysts are effective, they may also suffer from the drawback of requiring high temperatures (80° C.-110° C.) to achieve sufficient reactivity to catalyze formation of siloxane bonds.

SUMMARY

A composition comprises: A) a fluorinated triarylborane Lewis acid and B) a silyl hydride. The composition may be used in a method comprising combining A) the fluorinated triarylborane Lewis acid, B) the silyl hydride, and C) water; thereby forming a product. The product has a siloxane bond formed by the reaction of the SiH moiety from the silyl hydride and the water.

DETAILED DESCRIPTION

The composition comprises: A) a fluorinated triarylborane Lewis acid and B) a silyl hydride. The composition may be free of water. Alternatively, the composition may consist essentially of A) the fluorinated triarylborane Lewis acid and B) the silyl hydride. Alternatively, the composition may consist of: A) the fluorinated triarylborane Lewis acid and B) the silyl hydride. The composition may be stored under conditions that prevent reaction of silicon-bonded hydrogen atoms from the silyl hydride, e.g., anhydrous conditions, before use.

The method described herein comprises 1) combining starting materials comprising (alternatively, consisting essentially of; alternatively consisting of) A) and B), described above, and C) water. Combining is performed under conditions that will react the silicon-bonded hydrogen atoms of starting material B) to form a siloxane bond and a by-product comprising hydrogen.

These conditions may comprise mixing, e.g., by any convenient means. Mixing may be performed using conventional mixing equipment, such as an agitated batch kettle. Mixing may be performed at any convenient temperature, e.g., RT. Alternatively, when the silyl hydride selected for starting material B) is viscous, mixing under shear may be performed, e.g., with an extruder. The composition may be formed, e.g., by mixing starting materials A) and B) described above. Starting materials A) and B) may be heated at a temperature of 50° C. to 150° C., alternatively 100° C. to 125° C. during mixing. Optionally, starting material D) a solvent may be used to facilitate combining starting materials A) and B). For example, starting material A) may be dissolved in the solvent before being mixed with starting material D). Without wishing to be bound by theory, it is thought that use of the fluorinated triarylborane Lewis acid described herein, instead of other catalysts, such as Pt based catalysts or FAB, can provide the benefit of stability of the composition when starting materials A) and B) are present together before step 1) of the method described herein, even when starting materials A) and B) are combined with heating.

Exposing a composition comprising starting materials A) and B) to C) water in step 1) of the method will begin reacting the silicon-bonded hydrogen atoms and water to form a siloxane bond. Water may be mixed with starting materials A) and B) using means as described above, and starting materials A), B), and C) may be combined concurrently in step 1). Alternatively, the composition comprising starting materials A) and B) may be prepared before step 1), and thereafter in step 1), the composition may be exposed to water, e.g., by exposure to humid air. Exposure to water may be performed at a temperature of 5° C. to 150° C., alternatively RT to 150° C., alternatively 5° C. to 125° C., and alternatively RT to 125° C. Without wishing to be bound by theory, it is thought that temperature for exposure to water will depend on the silyl hydrides selected. For example, when starting material B) comprises, e.g., a silyl functional polyolefin, then higher temperatures (e.g., 50° C. to 150° C.) may be used. When starting material B) is, e.g., a silane, then lower temperatures may be sufficient. For example, temperature may alternatively be RT to 70° C., 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C.

The method may optionally further comprise one or more additional steps. The method may further comprise: step 2) during and/or after step 1), removing the $H_2$ generated during formation of the product and/or step 3) removing and/or neutralizing residual fluorinated triarylborane Lewis acid in the product. By-product $H_2$ may be removed by any convenient means, such as stripping and/or burning. Removing and/or neutralizing may be performed by adding E) a neutralizing agent to the product, or alternatively, adding E) a neutralizing agent to the product and optionally thereafter filtering the product. Steps 2) and 3) may be performed in any order. If a particulate by-product is present, e.g., as a result of neutralization, the method may further comprise step 4) removing a particulate such as alumina after neutralization by any convenient means, such as filtration.

Starting Material A) Catalyst

Starting material A) in the composition and method described herein is the fluorinated triarylborane Lewis acid. The fluorinated triarylborane Lewis acid has formula:

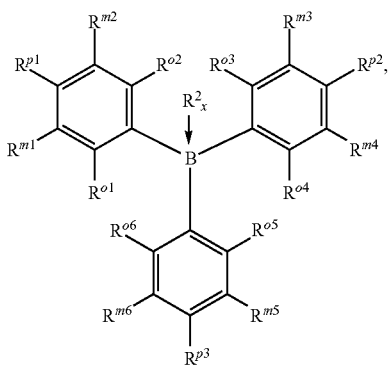

where each $R^o$ is an ortho substituent, each $R^m$ is a meta substituent, and each RP is a para substituent, $R^2$ optional and includes a functional group or a functional polymer group; and subscript x is 0 or 1. In the formula above, each of $R^{o1-6}$, each of $R^{m1-6}$, and each of $R^{p1-3}$ is independently selected from H, F, or $CF_3$; with the provisos that: not all of $R^{o1-6}$, $R^{m1-6}$, and $R^{p1-3}$ can be F simultaneously; not all of $R^{o1-6}$, $R^{m1-6}$, and $R^{p1-3}$ can be H simultaneously; and when two or more of $R^{o1-4}$ are $CF_3$, then $R^{o5}$ and $R^{o6}$ are each independently selected from H or F. $R^2$ is optional, i.e., $R^2$ is present when subscript x=1 and $R^2$ is absent when subscript x=0. $R^2$ may be a Lewis base that forms a complex with the fluorinated triarylborane Lewis acid and/or a molecule or moiety that contains at least one electron pair that is available to form a dative bond with the Lewis acid, and may be as described for $R^4$ in WO2019/055740 at paragraphs [0024] to [0025]. Examples of $R^2$ include cyclic ethers such as tetrahydrofuran or tetrahydropyran. Alternatively, $R^2$ may be tetrahydrofuran (THF).

Alternatively, each of $R^{o1}$, $R^{o2}$, $R^{o3}$, $R^{o4}$, $R^{o5}$, and $R^{o6}$ may be H. Alternatively, each of $R^{o1}$, $R^{o2}$, $R^{o3}$, and $R^{o4}$ may be H. Alternatively, each of $R^{o5}$ and $R^{o6}$ may be F.

Alternatively, each of $R^{m1}$, $R^{m2}$, $R^{m3}$, $R^{m4}$, $R^{m5}$, and $R^{m6}$ may be $CF_3$. Alternatively, each of $R^{m1}$, $R^{m2}$, $R^{m3}$, and $R^{m4}$ may be $CF_3$. Alternatively, each of $R^{m5}$ and $R^{m6}$ may be F. Alternatively, each of $R^{m5}$ and $R^{m6}$ may be H.

Alternatively, each of $R^{p1}$, $R^{p2}$, and $R^{p3}$ may be H. Alternatively, $R^{p1}$ and $R^{p2}$ may be H. Alternatively, $R^{p3}$ may be F. Alternatively, $R^{p3}$ may be $CF_3$.

Alternatively, each of $R^{o1}$, $R^{o2}$, $R^{o3}$, $R^{o4}$, $R^{o5}$, $R^{o6}$, $R^{p1}$, $R^{p2}$, and $R^{p3}$ may be H; and each of $R^{m1}$, $R^{m2}$, $R^{m3}$, $R^{m4}$, $R^{m5}$, and $R^{m6}$ may be $CF_3$. Subscript x may be 1. Alternatively, starting material A) may comprise tris(3,5-bis(trifluoromethyl)phenyl)borane THF adduct.

Alternatively, each of $R^{o1}$, $R^{o2}$, $R^{o3}$, $R^{o4}$, $R^{o5}$, $R^{o6}$, $R^{m5}$, $R^{m6}$, $R^{p1}$, and $R^{p2}$ may be H; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(4-trifluoromethylphenyl)borane THF adduct.

Alternatively, each of $R^{o1}$, $R^{o2}$, $R^{o3}$, $R^{o4}$, $R^{m5}$, $R^{m6}$, $R^{p1}$, and $R^{p2}$ may be H; each of $R^{o5}$, $R^{o6}$, and $R^{p3}$ may be F; and each of $R^{m1}$, $R^{m2}$, $R^{m3}$, $R^{m4}$, may be $CF_3$. Subscript x may be 1. Alternatively, starting material A) may comprise bis(3,5-bis(trifluoromethyl)phenyl)(2,4,6-trifluorophenyl)borane THF adduct.

Alternatively, each of $R^{o1}$, $R^{o2}$, $R^{o3}$, $R^{o4}$, $R^{m5}$, $R^{m6}$, $R^{p1}$, $R^{p2}$, and $R^{p3}$ may be H; $R^{o5}$ and $R^{o6}$ may be F; and each of $R^{m1}$, $R^{m2}$, $R^{m3}$, and $R^{m4}$ may be $CF_3$. Subscript x may be 1. Alternatively, starting material A) may comprise bis(3,5-bis(trifluoromethyl)phenyl)(2,6-difluorophenyl)borane THF adduct.

Alternatively, each of $R^{o1}$, $R^{o2}$, $R^{o3}$, $R^{o4}$, $R^{o5}$, $R^{m6}$, $R^{p1}$, $R^{p2}$, and $R^{p3}$ may be H; and each of $R^{m1}$, $R^{m2}$, $R^{m3}$, $R^{m4}$, $R^{m5}$, and $R^{o6}$ may be $CF_3$. Subscript x may be 0. Alternatively, starting material A) may comprise bis(3,5-bis(trifluoromethyl)phenyl)(2,5-bis(trifluoromethyl)phenyl)borane.

Alternatively, each of $R^{m1}$, $R^{p1}$, $R^{o2}$, $R^{o3}$, $R^{o4}$, $R^{p2}$, $R^{p3}$, $R^{o5}$, and $R^{m6}$ may be H; and each of $R^{o1}$, $R^{m2}$, $R^{m3}$, $R^{m4}$, $R^{o6}$, and $R^{m5}$ may be $CF_3$. Subscript x may be 0. Alternatively, starting material A) may comprise (3,5-bis(trifluoromethyl)phenyl)bis(2,5-bis(trifluoromethyl)phenyl)borane.

Alternatively, each of $R^{o1}$, $R^{o2}$, $R^{o3}$, $R^{o4}$, $R^{p1}$, and $R^{p2}$ may be H; each of $R^{o5}$, $R^{o6}$, $R^{m5}$, and $R^{m6}$ may be F; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(2,3,5,6-tetrafluoro-4-trifluoromethylphenyl)borane THF adduct.

Alternatively, the fluorinated triarylborane Lewis acid may be selected from the group consisting of: A1) tris(3,5-bis(trifluoromethyl)phenyl)borane THF adduct; A2) bis(3,5-bis(trifluoromethyl)phenyl)(4-trifluoromethylphenyl)borane THF adduct; A3) bis(3,5-bis(trifluoromethyl)phenyl)(2,4,6-trifluorophenyl)borane THF adduct; A4) bis(3,5-bis(trifluoromethyl)phenyl)(2,6-difluorophenyl)borane THF adduct; A5) bis(3,5-bis(trifluoromethyl)phenyl)(2,5-bis(trifluoromethyl)phenyl)borane; A6) (3,5-bis(trifluoromethyl)phenyl)bis(2,5-bis(trifluoromethyl)phenyl)borane; A7) bis(3,5-bis(trifluoromethyl)phenyl)(2,3,5,6-tetrafluoro-4-trifluoromethylphenyl)borane THF adduct; and A8) a combination of two or more of A1) to A7). Alternatively, the fluorinated triarylborane Lewis acid may be selected from the group consisting of A2), A3), A4), A5), A6), A7), and a combination of two or more of A2) to A7). Alternatively, the fluorinated triarylborane Lewis acid may be selected from the group consisting of A4), A5), A6), and a combination of two or more of A4), A5), and A6). Alternatively, the fluorinated triarylborane Lewis acid may be selected from the group consisting of A4), A5), and A6). Alternatively, the fluorinated triarylborane Lewis acid may be selected from the group consisting of A4) and A6).

Fluorinated triarylborane Lewis acids are known in the art, and may be prepared by known methods, for example, the methods disclosed in WO2019/055740, particularly at paragraphs [0052] to [0096] by varying appropriate starting materials.

The amount of starting material A) will depend on the type and amount of other starting materials used, however, starting material A) may be present in an amount of 0.5 ppm to 5 mol %, alternatively 5 ppm to 6000 ppm based on combined weights of starting materials A) and B) in the composition. Alternatively, the amount may be 5 ppm to 600 ppm, alternatively 5 ppm to 500 ppm, and alternatively 5 ppm to 100 ppm, on the same basis.

B) Silyl Hydride

Starting material B) in the composition and method described herein is a silyl hydride. The term "silyl hydride" means a molecule that contains at least one silicon-bonded hydrogen atom (SiH) per molecule. Alternatively, the silyl hydride may have more than one SiH per molecule. Silyl hydrides used herein are capable of forming a siloxane bond in the presence of A) the fluorinated triarylborane Lewis acid and C) water. Silyl hydrides containing multiple Si—H bonds may be capable of self-crosslinking in the presence of A) the fluorinated triarylborane Lewis acid and C) water. Starting material B) can be selected from the group consisting of B1) a silane, B2) a polyorganohydrogensiloxane, B3) a silyl-functional polyolefin, and B4) a combination of two or more of B1), B2), and B3).

The silyl hydride can be B1) a silane (e.g., with one silicon atom per molecule). Alternatively, the silyl hydride may be oligomeric or polymeric. Polymeric silyl hydrides can be linear, branched, or resinous. For example, the silyl hydride may be B2) a polyorganohydrogensiloxane. Alternatively, the silyl hydride may be B3) an organic polymer functionalized with a moiety including the SiH.

B1) Silane

Starting material B1) is a silane of formula $H_kSiR^5_{(4-k)}$, where each $R^5$ is independently selected from the group consisting of a monovalent hydrocarbon group and a monovalent halogenated hydrocarbon group, and subscript k is 1 to 3, alternatively 1 or 2, and alternatively 1. Examples of suitable monovalent hydrocarbon groups for $R^5$ include, but are not limited to, alkyl such methyl, ethyl, propyl, butyl, pentyl, hexyl, heptyl, octyl, decyl, dodecyl, undecyl, and octadecyl (and branched isomers thereof); cycloalkyl such as cyclopentyl and cyclohexyl; alkenyl such as vinyl, allyl, butenyl, and hexenyl; and aryl such as phenyl, tolyl, xylyl, naphthyl, benzyl, 1-phenylethyl, and 2-phenylethyl. Examples of monovalent halogenated hydrocarbon groups for $R^5$ include, but are not limited to, chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Alternatively, each $R^5$ may be a monovalent hydrocarbon group, alternatively an alkyl group or an aryl group. Alternatively, each $R^5$ may be an alkyl group, such as an alkyl group of 1 to 6 carbon atoms. Alternatively, each $R^5$ may be methyl or ethyl. Alternatively, starting material B1) may be a silane of formula $HSiR^5_3$, where each $R^5$ is an alkyl group of 1 to 6 carbon atoms.

Examples of suitable silanes for starting material B1) are known in the art and are commercially available. Suitable silanes include triethylsilane, dimethylethylsilane, diethylmethylsilane, dimethylisopropylsilane, dimethyl-tert-butylsilane, triisopropylsilane, chloromethyldimethylsilane, tripropyplsilane, tributylsilane, triisobutylsilane, trihexylsilane, trioctylsilane, cyclohexyldimethylsilane, dimethylphenylsilane, diphenylmethylsilane, triphenylsilane, phenylsilane, bromoundecylsilane, 2-chloroethylsilane, dodecylsilane, n-octadecylsilane, and (tridecafluoro-1,1,2,2-tetrahydrooctyl)silane, which are available from Sigma-Aldrich Inc. of St. Louis Missouri, USA or Gelest Inc., of Morrisville, Pennsylvania, USA.

B2) Polyorganohydrogensiloxane

When starting material B2), a polyorganohydrogensiloxane is used, the polyorganohydrogensiloxane may be a homopolymer or a copolymer. The polyorganohydrogensiloxane may be linear, branched, or resinous. The silicon-bonded hydrogen atoms in the polyorganohydrogensiloxane can be located at terminal, pendant, or at both terminal and pendant positions.

The polyorganohydrogensiloxane may comprise two or more siloxane units selected from $HR^4_2SiO_{1/2}$, $R^4_3SiO_{1/2}$, $HR^4SiO_{2/2}$, $R^4_2SiO_{2/2}$, $R^4SiO_{3/2}$, $HSiO_{3/2}$ and $SiO_{4/2}$ units. In the preceding formulae, each $R^4$ is an independently selected monovalent hydrocarbon group, which is free of aliphatic unsaturation. Examples of suitable monovalent hydrocarbon groups for $R^4$ include, but are not limited to, alkyl such methyl, ethyl, propyl, butyl, pentyl, hexyl, heptyl, octyl, decyl, dodecyl, undecyl, and octadecyl (and branched isomers thereof); cycloalkyl such as cyclopentyl and cyclohexyl; and aryl such as phenyl, tolyl, xylyl, naphthyl, benzyl, 1-phenylethyl, and 2-phenylethyl. Alternatively, each $R^4$ may be an alkyl group or a cycloalkyl group. Alternatively, each $R^4$ may be an alkyl group, such as methyl.

When the polyorganohydrogensiloxane is linear, i.e., is a polydiorganohydrogensiloxane, the polydiorganohydrogensiloxane may have unit formula: $(HR^4_2SiO_{1/2})_g(R^4_3SiO_{1/2})_h(R^4_2SiO_{2/2})_i(HR^4SiO_{2/2})_j$, where $R^4$ is as described above, and subscripts g, h, i, and j have values such that g≥0, h≥0, a quantity (g+h) has an average value of 2, i≥0, j≥0, and a quantity (g+j)≥1, and a quantity (i+j) ranges from 0 to 1000.

Alternatively, the polydiorganohydrogensiloxane may have formula

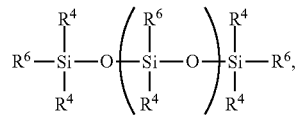

where subscript m is 0 or 1, and each $R^6$ is independently selected from the group consisting of H and $R^4$, with the proviso that at least one $R^6$ is a hydrogen atom.

Suitable polyorganohydrogensiloxanes are exemplified by:

i) pentamethyldisiloxane, ii) bis(trimethylsiloxy)methyl-silane, iii) tetramethyldisiloxane, iv) bis-dimethylhydrogensiloxy-terminated polydimethylsiloxane, vii) bis-dimethylhydrogensiloxy-terminated poly(dimethylsiloxane/methylhydrogensiloxane), vi) bis-dimethylhydrogensiloxy-terminated polymethylhydrogensiloxane, vii) bis-trimethylsiloxy-terminated poly(dimethylsiloxane/methylhydrogensiloxane), viii) bis-trimethylsiloxy-terminated polymethylhydrogensiloxane, ix) a resin consisting essentially of $H(CH_3)_2SiO_{1/2}$ units and $SiO_{4/2}$ units, and x) a combination of two or more of i) to ix).

Methods of preparing linear and branched polyorganohydrogensiloxanes suitable for use as starting material B2), such as hydrolysis and condensation of organohalosilanes, are well known in the art, as exemplified in U.S. Pat. Nos. 5,310,843; 4,370,358; 4,707,531; and 4,329,273. Polyorganohydrogensiloxanes are also commercially available, such as those available from Gelest under the tradenames: DMS-HM15, DMS-H03, DMS-H25, DMS-H31, and DMS-H41.

B3) Silyl-Functional Polyolefin

Starting material B3) is a polyolefin having a silicon-bonded hydrogen functional group formula (B3-1):

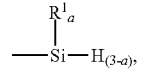

where each $R^1$ is an independently selected monovalent hydrocarbon group and each subscript a is independently 1 or 2. Suitable monovalent hydrocarbon groups for $R^1$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the monovalent hydrocarbon groups for $R^1$ may be selected from the group consisting of alkyl groups, alkenyl groups and aryl groups; alternatively alkyl and aryl; and alternatively alkyl. The alkyl groups are exemplified by methyl, ethyl, propyl (e.g., isopropyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms including cycloalkyl groups such as cyclopentyl and cyclohexyl. The alkenyl groups are exemplified by, but not limited to, vinyl, allyl, butenyl (including n-butenyl, iso-butenyl, and/or t-butenyl), and hexenyl (including linear and branched isomers thereof). The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^1$ may be independently selected from the group consisting of alkyl and aryl, alternatively methyl and phenyl. Alternatively, each $R^1$ may be methyl.

Starting material B3) the silyl-functional polyolefin may have silyl groups of formula (B3-1) in a pendant position. For example, the silyl-functional polyolefin having pendant silyl groups may be an SiH functional polyolefin copolymer comprising unit formula (B3-2):

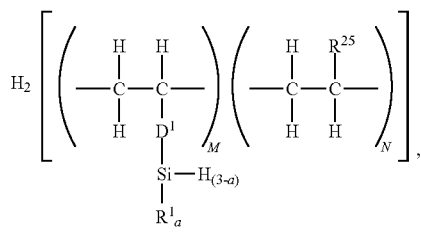

where $R^1$ and subscript a are as described above.

Each $D^1$ in unit formula (B3-2) is independently a divalent hydrocarbon group of 2 to 50 carbon atoms. Suitable divalent hydrocarbon groups for $D^1$ are exemplified by an alkylene group such as ethylene, propylene, butylene, hexylene, or octylene; an arylene group such as phenylene, or an alkylarylene group such as:

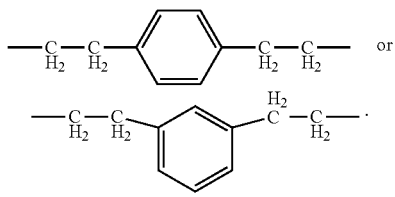

Alternatively, each $D^1$ is an alkylene group such as ethylene, propylene, or octylene.

In unit formula (B3-2), each $R^{25}$ is independently H, a monovalent hydrocarbon group of 1 to 18 carbon atoms or a monovalent halogenated hydrocarbon group of 1 to 18 carbon atoms. Monovalent hydrocarbon groups suitable for $R^{25}$ are exemplified by those described herein for $R^1$ having 1 to 18 carbon atoms. Suitable monovalent halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl. Alternatively, each $R^{25}$ may be H or an alkyl group of 1 to 6 carbon atoms. Alternatively, each $R^{25}$ may be H.

In unit formula (B3-2), subscript M is at least 1. Subscript N is at least 1. Alternatively, $1 \leq M \leq 10$. Alternatively, $10 \leq N \leq 20,000$. Alternatively, subscripts M and N may have values such that a quantity M/(M+N) may have a value such that 0.01 mol % $\leq$ M/(M+N) $\leq$ 10 mol %. Alternatively, subscripts M and N may have values sufficient to provide the copolymer with a Mn of 1,000 to 500,000.

This SiH-functional polyolefin may further comprise $R^{21}$ endblocking groups at each terminus. Each $R^{21}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality). Examples of such SiH-functional polyolefins (silyl functional olefin interpolymers) and methods for their preparation are disclosed, for example, in U.S. Pat. No. 6,624,254 to Arriola, et al.

Alternatively, B3) the silyl-functional polyolefin may comprise a silyl-terminated polyolefin having 1 to 2 terminal silyl groups of formula (B3-1) per molecule. The silyl-terminated polyolefin may have unit formula (B3-3):

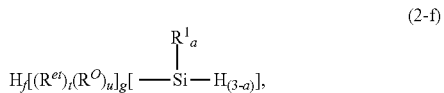

(2-f)

where subscript a and $R^1$ are as described above, subscript f is 0 to 1, subscripts t and u have relative values such that $0 < t \leq 1$, $0 \leq u \leq 1$, subscript g is 1 or more, each $R^{et}$ represents an ethylene unit, and each $R^O$ represents an olefin unit, other than ethylene. $R^O$ may be an alpha-olefin or a cyclic olefin. Examples of alpha-olefins are as described below and include ethylene, propylene, and octene. Examples of cyclic olefins are as described below and include ethyldienenorbornene, norbornene, vinyl norbornene, vinyl cyclohexene, cyclohexene, and cyclopentene. Alternatively, subscript g may be 1 to 500, alternatively 10 to 400, and alternatively 18 to 360. Alternatively, subscript g may have a value sufficient to give the silyl-terminated polyolefin a Mn of 500 to 50,000 g/mol, alternatively 500 to 10,000 g/mol.

Alternatively, the silyl-terminated polyolefin may have unit formula (B3-4):

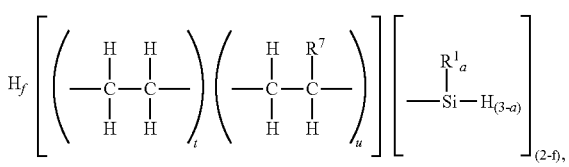

where subscripts a, f, g, t, and u, and $R^1$ are as described above. Each $R^7$ is independently a monovalent hydrocarbon group of 1 to 20 carbon atoms. The monovalent hydrocarbon group for $R^7$ may be alkyl, alkenyl or aryl; alternatively alkyl. Alternatively, $R^7$ may be an alkyl group of 2 to 12 carbon atoms, and alternatively 2 to 6 carbon atoms. Alternatively, each $R^7$ is a hexyl group.

The silyl-terminated polyolefin may have one terminal silyl group per molecule (i.e., where subscript f=1). Examples of this silyl-terminated polyolefin having a silyl group at one end of the polymer chain include dimethyl, hydrogensilyl-terminated polyethylene; dimethyl-hydrogensilyl-terminated poly(ethylene/octene) copolymer; methyl-dihydrogensilyl-terminated polyethylene; methyl-dihydrogensilyl-terminated poly(ethylene/octene) copolymer; diphenyl-hydrogensilyl-terminated polyethylene; diphenyl-hydrogensilyl-terminated poly(ethylene/octene) copolymer; phenyl-dihydrogensilyl-terminated polyethylene; phenyl-dihydrogensilyl-terminated poly(ethylene/octene) copolymer; chlorophenylhydrogensilyl-terminated polyethylene; or chlorophenylhydrogensilyl-terminated poly(ethylene/octene) copolymer. This silyl-terminated polyolefin can be prepared by the processes described in PCT Publication WO2019/082992 corresponding to U.S. Patent Application Ser. 62/644,635, filed on Mar. 19, 2018 and PCT Publication WO2019/182986 corresponding to U.S. Patent Application Ser. No. 62/644,624 filed on Mar. 19, 2018, which are both hereby incorporated by reference.

Alternatively, starting material B3), the silyl-terminated polyolefin, may have two silyl terminal groups per molecule (i.e., in formulae (B3-3) and (B3-4) where subscript f=0, the silyl terminated polyolefin is telechelic. Such telechelic silyl-terminated polyolefins may be prepared by methods, such as those disclosed in PCT Publication WO2019/182993 corresponding to U.S. Patent Application Ser. No. 62/644,808, filed on Mar. 19, 2018, which is hereby incorporated by reference.

Starting material B3) may be one silyl hydride or may comprise two or more silyl hydrides that differ in at least one property. For example, starting material B3) may be silyl-functional polyolefin or may comprise two or more silyl-functional polyolefins differing in at least one of the following properties: structure, viscosity, average molecular weight, olefin blocks, and sequence.

C) Water

Starting material C), the water, is not generally limited, and may be used neat (i.e., absent any solvents), and/or pure (i.e., free from or substantially free from minerals and/or other impurities). For example, the water C) may be processed or unprocessed before use in the method described above. Examples of processes that may be used for purifying the water include distilling, filtering, deionizing, and combinations of two or more thereof, such that the water may be deionized, distilled, and/or filtered. Alternatively, the water may be unprocessed (e.g. may be tap water, provided by a municipal water system or well water, used without further purification).

The water may be used in any amount, which will be selected by one of skill in the art, depending on various factors, e.g., the particular catalyst selected for starting material A), the reaction parameters employed, and the scale of the reaction (e.g., total amount and SiH content of starting material B)).

D) Solvent

Starting material D) is an optional solvent, which may be used to facilitate combination of the starting materials. Solvents used herein are those that help fluidize the starting materials, but essentially do not react with any of these starting materials. Solvent may be selected based on solubility of the starting materials and volatility of the solvent. The solubility refers to the solvent being sufficient to dissolve and/or disperse the starting materials. Volatility refers to vapor pressure of the solvent. For example, starting material A), the fluorinated triarylborane Lewis acid, may be dissolved in a solvent before step 1). Alternatively, starting material B) may be dissolved in a solvent, e.g., when starting material B) is viscous, elastomeric, or resinous. The solvent may be used in any amount, which will be selected by one of skill in the art, depending on various factors, such as the selection of starting material B) and the solubility of starting material A) therein.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. One solvent, or a combination comprising two or more solvents, may be used herein.

The amount of solvent can depend on various factors including the type of solvent selected and the amount and type of other starting materials selected. However, the amount of solvent may range from 0.1% to 99%, alternatively 2% to 50%, based on combined weights of starting materials A) and B).

Starting Material E) Neutralizing Agent

Starting material E) is a neutralizing agent that may optionally be used to neutralize starting material A) after the product forms. Alumina, triphenylamine, triethylamine, triphenylphosphine, and phenylacetylene are suitable neutralizing agents. Neutralizing agents are known in the art and are commercially available, e.g., from Millipore Sigma of St. Louis, Missouri, USA. The amount of neutralizing agent depends on various factors including the amount of starting material A), however, starting material E) may be present in an amount sufficient to provide a weight ratio of neutralizing agent to fluorinated triarylborane Lewis acid (E:A ratio) of 100:1 to 1:1000, alternatively 1:1 to 1000:1, and alternatively 100:1 to 1:1. Alternatively, when the neutralizing agent is triphenylphosphine or phenylacetylene, the E:A ratio may be 1:1 to 20:1. Alternatively, when the neutralizing agent is alumina, the E:A ratio may be 100:1 to 1000:1.

Method of Use

The composition and method described herein can be used in the preparation of siloxanes, siloxane-organic hybrid copolymers, intermediates, and/or branched siloxane networks. Without wishing to be bound by theory, it is thought that the composition and method described herein may be used as a cure system for various formulations and applications. The composition provides the benefit of storage stability when starting materials A) and B) are combined and stored before use.

EXAMPLES

These examples are intended to illustrate the invention and should not be interpreted as limiting the scope of the invention set forth in the claims. The starting materials described in Table 1 and Reference Examples 1 and 2 were used in the examples herein.

TABLE 1

Starting Materials

| Name | Chemical Description | Supplier |
|---|---|---|
| FAB | Tris(pentafluorophenyl)borane | TCI |
| Heptane | n-Heptane | Millipore Sigma |
| THF | Tetrahydrofuran | Millipore Sigma |
| Toluene | Toluene | Millipore Sigma |
| DEE | Diethyl ether | Millipore Sigma |
| $CDCl_3$ | Deuterated chloroform | Cambridge Isotope Laboratories, Inc. |
| $CD_2Cl_2$ | Deuterated methylene chloride | Cambridge Isotope Laboratories, Inc. |
| $C_6D_6$ | Deuterated benzene | Cambridge Isotope Laboratories, Inc. |
| | 1-Octene | Chevron Corporation |
| ISOPAR-E | an isoparaffin fluid, typically containing less than 1 ppm benzene and less than 1 ppm sulfur | ExxonMobil Chemical Company |
| | A2 Alumina | Brenntag/Coastal Chemical Company |
| Q5 reactant | Oxygen scavenger | Now known as Cu-0226 S, supplied by BASF |
| | A204 alumina | LaRoche Industries, Inc. |
| | 4 Å mol sieves | Millipore Sigma |
| HDMS | 5-hexenyldimethylsilane | Dow Silicones Corporation |
| ODMS | 7-octenyldimethylsilane | Gelest, Inc. |
| | Ethylene | Airgas |
| Scavenger MMAO-3A | methyl aluminoxane | Akzo Nobel |
| Activator | bis(hydrogenated tallow alkyl)methylammonium tetrakis(pentafluorophenyl)borate | Boulder Scientific |
| Q5 reactant | Oxygen scavenger | Now known as Cu-0226 S, supplied by BASF |

Reference Example 1—General Procedures

Unless otherwise noted, all experimental procedures and manipulations of chemical substances were performed in a nitrogen-purged glove box or on a Schlenk line. All bulk reaction solvents (toluene, diethyl ether, hexane, tetrahydrofuran (THF)) were dried by passage through columns of alumina and Q5 reactive scavenger. All other solvents were purchased from Aldrich anhydrous grade and stored over activated 3 Å molecular sieves prior to use. NMR solvents ($CDCl_3$, $CD_2Cl_2$, and $C_6D_6$), obtained from Cambridge Isotope Laboratories, Inc., were dried over active 3 Å molecular sieves or, in the case of $C_6D_6$, dried using Na/K alloy. 1-Bromo-3,5-bis(trifluoromethyl)benzene, 1-bromo-2,5-bis(trifluoromethyl)benzene, 1-bromo-2,6-difluorobenzene, 1-bromo-2,4,6-trifluorobenzene, and 1-bromo-4-trifluoromethylbenzene were purchased from Oakwood Chemical. 1-Bromo-2,3,5,6-tetrafluoro-4-trifluoromethylbenzene was purchased from Alfa Aesar. FAB was purchased from TCI. All other reagents were purchased from Sigma-Aldrich and used as received. n-Butyllithium (solution in hexanes) was titrated using 1.00 M decanol in toluene with 1,10-phenanthroline as an indicator prior to use.[1]

Multinuclear NMR spectra ($^1H$, $^{13}C$, $^{19}F$, $^{29}Si$, $^{11}B$) were collected on one of the following instruments: Varian MR-400 or Varian VNMRS-500. $^{11}B$ NMR spectra were collected only on the Varian VNMRS-500. The $^1H$ and $^{13}C$ NMR chemical shifts were referenced in parts per million relative to residual solvent peaks: $^1H$-5.32 ppm for $CD_2Cl_2$, 7.15 ppm for $C_6D_6$, 7.25 ppm for $CDCl_3$; $^{13}C$-54.00 ppm for $CD_2Cl_2$, 128.00 ppm for $C_6D_6$, 77.00 ppm for $CDCl_3$. $^{11}B$ NMR chemical shifts were referenced externally to $BF_3$ ($Et_2O$) (0 ppm), $^{19}F$ NMR chemical shifts were referenced externally to $CFCl_3$ (0 ppm). Sub-ambient reaction temperatures, except when dry ice or ice were the sole means of cooling, were measured using an Extech Instruments EasyView™10 Dual K model EA 10 thermometer with a fine JKEM sensor PTFE wire K 36INJ.

Reference Example 2—Synthetic Procedures—Preparation of Starting Materials

Preparation of lithium(diethyletherate) (3,5-bis(trifluoromethyl)phenyl)triisopropoxyborate was performed as follows

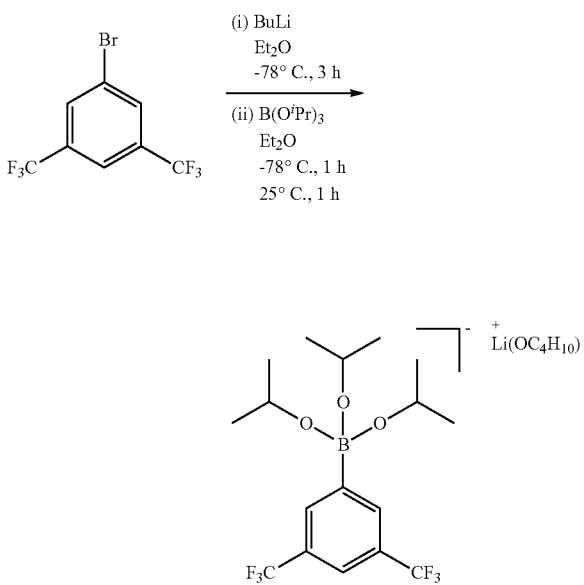

To a cold (−78° C., $CO_2$(s) bath) solution of 1-bromo-3,5-bis(trifluoromethyl)benzene (18.52 g, 63.19 mmol) in diethyl ether (200 mL) was added n-butyllithium (23.0 mL, 2.61 M in hexanes, 60.03

[1] Watson, S. C.; Eastham, J. F. "Colored indicators for simple direct titration of magnesium and lithium reagents", *J. Organomet. Chem.*, 1967, 9, 165-168.

mmol) with stirring. The reaction mixture was stirred for 3 hours at −78° C. with formation of precipitate. Triisopropylborate (11.86 g, 63.06 mmol) in ether (20 mL) was added slowly. The reaction mixture was stirred for 1 hour at −78° C., then was allowed to warm to ambient temperature and was stirred for 1 hour to give a slightly cloudy solution. The reaction mixture was filtered and the volatiles were removed under reduced pressure to give a solid. The solid was triturated with hexane, filtered, and the volatiles were removed under reduced pressure to give the product as a colorless powder. Yield: 23.16 g, 94.53%. The compound was initially isolated as its ether adduct.

$^1H$ NMR (500 MHz, THF-$d_8$) δ 8.15 (s, 2H), 7.57 (s, 1H), 3.79 (p, J=6.1 Hz, 3H), 0.95 (d, J=6.1 Hz, 18H). $^{13}C$ NMR (126 MHz, THF-$d_8$) δ 159.12, 134.71, 128.90 (q, J=31.3 Hz), 125.91 (q, J=271.8 Hz), 118.70, 67.41 (dtd, J=44.2, 22.2, 2.9 Hz), 61.67, 26.53 (d, J=17.7 Hz), 25.28 (dtd, J=40.4, 20.1, 3.0 Hz). $^{19}F$ NMR (470 MHz, THF-$d_8$) δ-63.02. $^{11}B$ NMR (160 MHz, THF-$d_8$) δ 3.84.

Preparation of (3,5-Bis(Trifluoromethyl)Phenyl)Diisopropoxyborane was Performed as Follows

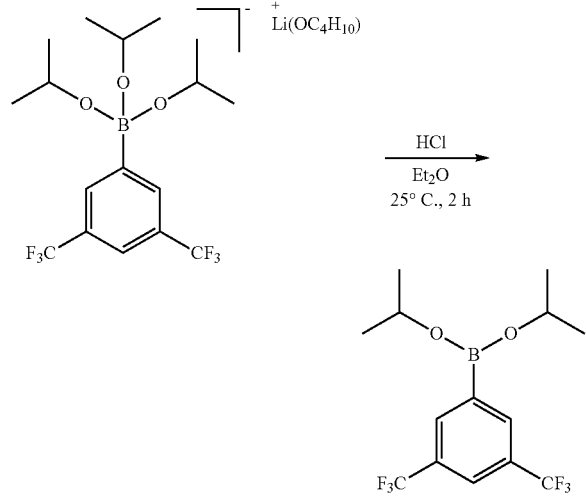

To a solution of lithium(diethyletherate) (3,5-bis(trifluoromethyl)phenyl)triisopropoxyborate (8.00 g, 19.6 mmol) in diethyl ether (100 mL) was added hydrogen chloride solution (12.3 mL, 2 M in ether, 24.6 mmol) with immediate formation of precipitate. The reaction mixture was stirred for two hours, filtered, and the volatiles were removed under reduced pressure. The resultant residue was extracted with hexane, filtered, and the volatiles were removed under reduced pressure to give the product as an oil. Yield: 5.10 g, 76.1%.

$^1$H NMR (500 MHz, Chloroform-d) δ 8.01 (d, J=1.9 Hz, 2H), 7.89 (dt, J=2.0, 1.0 Hz, 1H), 4.59 (hept, J=6.1 Hz, 1H), 1.27 (d, J=6.2 Hz, 6H). $^{13}$C NMR (126 MHz, Chloroform-d) δ 134.19, 132.85 (td, J=3.7, 1.9 Hz), 130.85 (q, J=32.9 Hz), 123.67 (d, J=272.6 Hz), 123.04 (hept, J=3.9 Hz), 67.00, 24.58. $^{19}$F NMR (470 MHz, Chloroform-d) δ-63.34. $^{11}$B NMR (160 MHz, Chloroform-d) δ 26.66.

Preparation of Lithium(Diethyletherate) Bis(3,5-Bis(Trifluoromethyl)Phenyl)Diisopropoxyborane was Performed as Follows

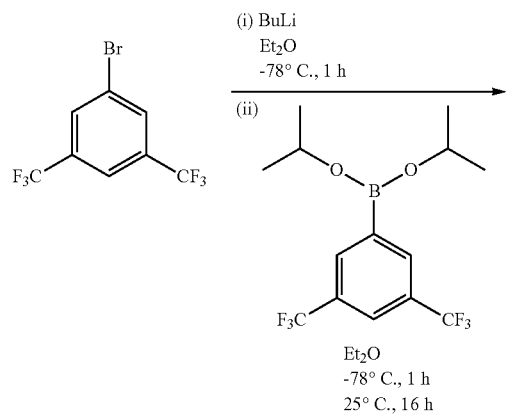

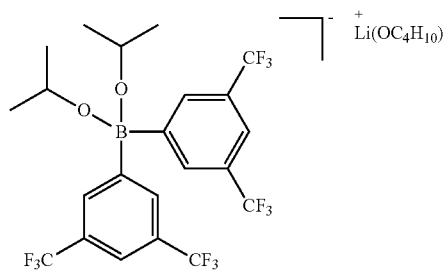

To a cold (−78° C., CO$_2$(s) bath) solution of 1-bromo-3,5-bis(trifluoromethyl)benzene (4.26 g, 14.5 mmol) in diethyl ether (200 mL) was added n-butyllithium (5.30 mL, 2.61 M in hexanes, 60.0 mmol) with stirring. The reaction mixture was stirred for 1 hour at −78° C. with formation of precipitate. (3,5-Bis(trifluoromethyl)phenyl)diisopropoxyborane (4.82 g, 14.1 mmol) in ether (15 mL) was added slowly. The reaction mixture was stirred for 1 hour at −78° C. (some solids visible), then was allowed to warm to ambient temperature and was stirred overnight to give a clear solution. The volatiles were removed under reduced pressure to give a crystalline-appearing solid. The solid was dissolved in hexane, the solution was filtered and placed in the freezer over the weekend. A large amount of crystalline material formed. The supernatant was decanted and the volatiles were removed under reduced pressure to give a colorless crystalline material. Yield of material: 8.23 g, 93.5%.

$^1$H NMR (400 MHz, Chloroform-d) δ 7.99 (d, J=1.9 Hz, 2H), 7.74 (dt, J=1.8, 1.0 Hz, 1H), 3.81 (q, J=7.1 Hz, 2H), 3.35 (hept, J=6.1 Hz, 1H), 1.45 (t, J=7.1 Hz, 3H), 0.78 (d, J=6.1 Hz, 6H). $^{13}$C NMR (101 MHz, Chloroform-d) δ 153.43, 134.19-133.42 (m), 129.51 (q, J=31.9 Hz), 124.42 (q, J=272.4 Hz), 119.68 (hept, J=4.0 Hz), 66.83, 63.03, 25.48, 14.66. $^{19}$F NMR (376 MHz, Chloroform-d) δ-63.05. $^{11}$B NMR (160 MHz, Chloroform-d) δ 5.12.

Preparation of Bis(3,5-Bis(Trifluoromethyl)Phenyl)Isopropoxy Borane was Performed as Follows

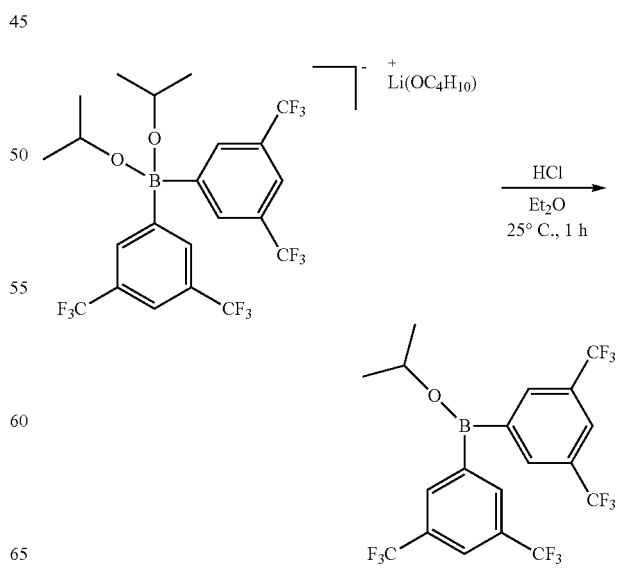

To a solution of lithium(diethyletherate) bis(3,5-bis(trifluoromethyl)phenyl)diisopropoxyborate (5.00 g, 7.86 mmol) in diethyl ether (100 mL) was added hydrogen chloride solution (5.5 mL, 2 M in ether, 11 mmol) with immediate formation of precipitate. The reaction mixture was stirred for one hour and the volatiles were removed under reduced pressure. The residue was extracted with hexane, filtered, and the volatiles were removed under reduced pressure to give the product as a colorless powder. Yield: 3.98 g, 102% (some residual solvent present).

$^1$H NMR (400 MHz, Chloroform-d) δ 8.00 (ddd, J=2.2, 1.4, 0.7 Hz, 2H), 7.98 (dq, J=1.9, 0.6 Hz, 4H), 4.54 (hept, J=6.1 Hz, 1H), 1.37 (d, J=6.1 Hz, 6H). $^{13}$C NMR (101 MHz, Chloroform-d) δ 138.42, 133.32, 131.36 (q, J=33.2 Hz), 124.39 (p, J=3.8 Hz), 123.39 (d, J=272.8 Hz), 71.74, 24.62. $^{19}$F NMR (376 MHz, Chloroform-d) δ-63.33. $^{11}$B NMR (160 MHz, Chloroform-d) δ 41.80.

Synthetic Procedures—Preparation of Catalysts

Catalyst Sample C1, tris(3,5-bis(trifluoromethyl)phenyl) borane THF adduct, was prepared as follows:

Preparation of Lithium Isopropoxytris(3,5-Bis(Trifluoromethyl)Phenyl)Borate n-Butyllithium (5.00 mL, 2.5 M in hexanes, 12.7 mmol) was added slowly dropwise to a cold (−78° C., CO$_2$(s) bath) solution of 1-bromo-3,5-bis(trifluoromethyl)benzene (3.76 g, 12.8 mmol) in diethyl ether (150 mL). The reaction mixture was stirred for 1 hour at −78° C. Isopropoxy-bis(3,5-bis(trifluoromethyl)phenyl)borane (6.29 g, 12.7 mmol) in ether (10 mL) was added slowly. The reaction mixture was stirred overnight while warming to ambient temperature to give a clear very pale-yellow solution. The volatiles were removed under reduced pressure to give a crystalline solid. The solid was dissolved in a minimum of boiling ether and the solution was placed in the freezer. After cooling overnight, the supernatant was decanted from the crystals which had formed and the crystals were dried under reduced pressure to give 6.74 g. A second crop of crystalline material (1.54 g) was obtained from concentrating the supernatant solution and cooling in the freezer overnight. Total yield: 8.28 g, 75.6%.

$^1$H NMR (400 MHz, Benzene-d$_6$) δ 8.09 (s, 6H), 7.74 (s, 3H), 3.71 (p, J=6.1 Hz, 1H), 2.97 (q, J=7.0 Hz, 10H), 0.70 (t, J=7.1 Hz, 15H), 0.67 (d, J=6.2 Hz, 6H). $^{13}$C NMR (101 MHz, Benzene-d$_6$) δ 157.09, 133.79, 130.75 (q, J=32.0 Hz), 124.71 (q, J=272.8 Hz), 119.91 (p, J=4.2 Hz), 65.91, 65.00, 25.47, 14.11. $^{19}$F NMR (376 MHz, Benzene-d$_6$) δ-62.76. $^{11}$B NMR (160 MHz, Benzene-d$_6$) δ 1.56.

Preparation of Tris(3,5-Bis(Trifluoromethyl)Phenyl)Borane THF Adduct

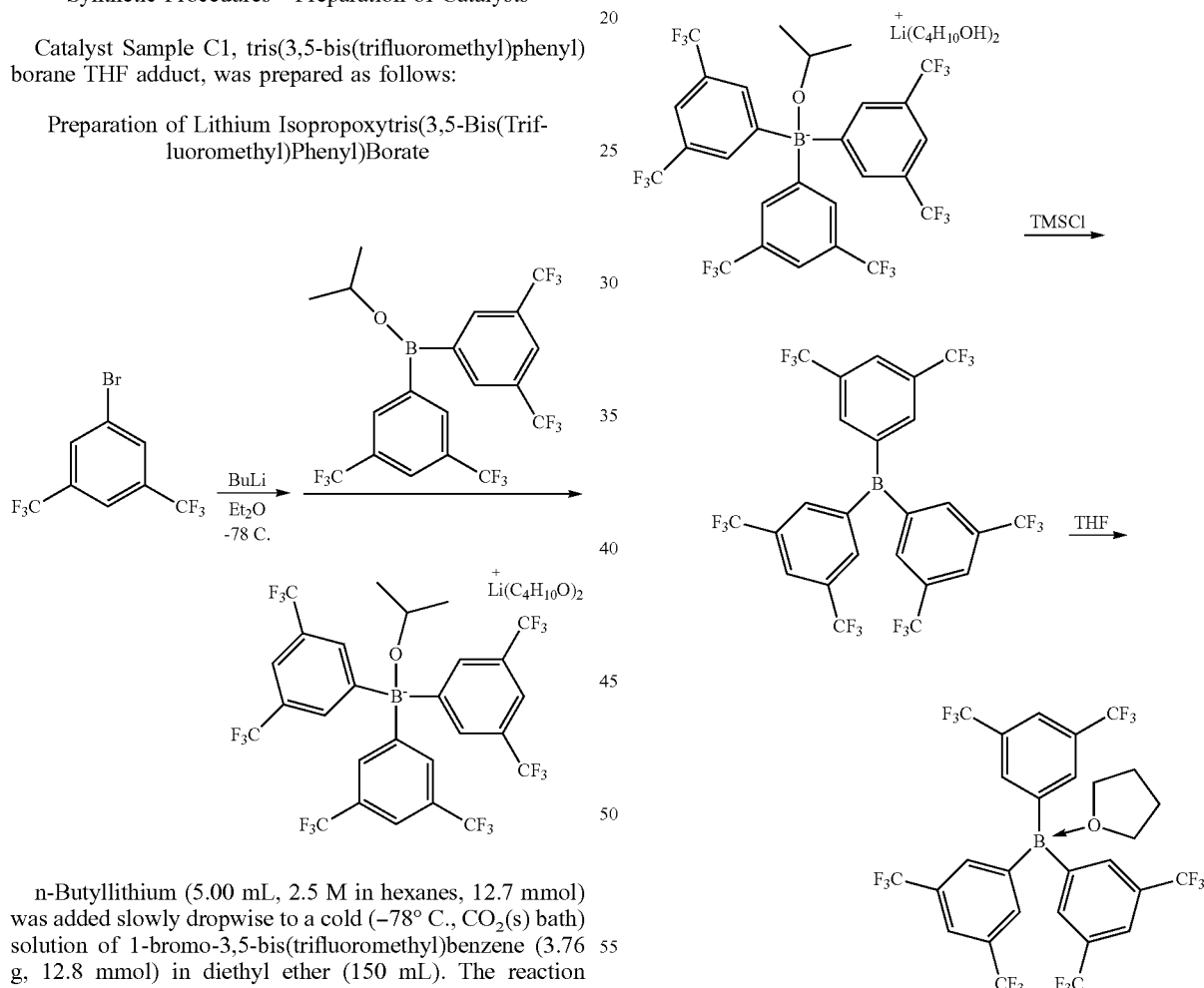

To a solution of lithium isopropoxytris(3,5-bis(trifluoromethyl)phenyl)borate (6.700 g, 7.75 mmol) in ether (100 mL) was added chlorotrimethylsilane (2.0 mL, 1.71 g, 15.8 mmol). The reaction mixture was stirred over the weekend. The reaction mixture was filtered and the volatiles were removed under reduced pressure to give the product as a colorless solid, 4.80 g, 95.2%.

Part of the solid (4.041 g) was dissolved in ether (100 mL) and THF (5 mL) was added. The volatiles were removed from the reaction mixture under reduced pressure. The residue was extracted with benzene, filtered, and the volatiles were removed from the reaction mixture under reduced pressure to give the THF-adduct product as a colorless solid, 4.10 g, 91.3%.

THF adduct: $^1$H NMR (400 MHz, Benzene-$d_6$) δ 7.80-7.78 (m, 6H), 7.72 (dq, J=1.8, 0.9 Hz, 3H), 2.90-2.83 (m, 4H), 0.57-0.49 (m, 4H). $^{13}$C NMR (101 MHz, Benzene-$d_6$) δ 148.11, 133.40, 131.38 (q, J=32.5 Hz), 124.21 (q, J=272.8 Hz), 121.37 (p, J=4.1 Hz), 74.14, 23.94 (d, J=2.7 Hz). $^{19}$F NMR (376 MHz, Benzene-$d_6$) δ -62.95. $^{11}$B NMR (160 MHz, Benzene-$d_6$) δ 11.84.

Catalyst sample C2, bis(3,5-bis(trifluoromethyl)phenyl) (4-trifluoromethylphenyl)borane THF adduct, was prepared as follows.

Preparation of Bis(3,5-Bis(Trifluoromethyl)Phenyl) (4-Trifluoromethylphenyl)Borane

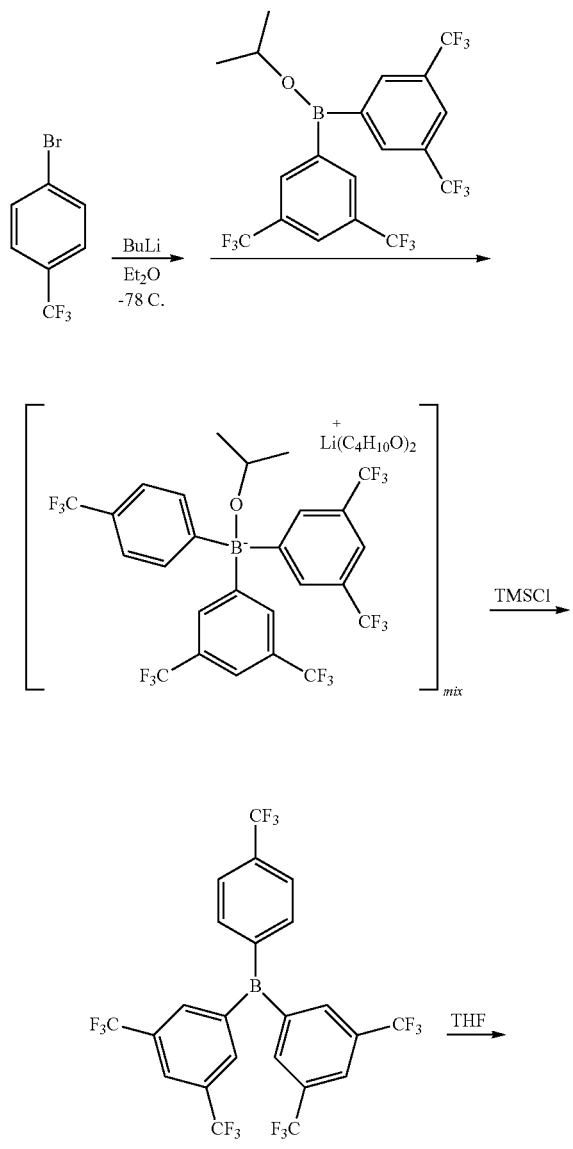

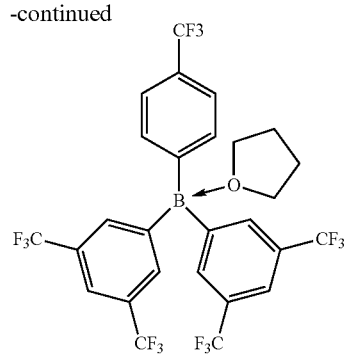

5.37 g, 68.8% n-Butyllithium (4.70 mL, 2.535 M in hexanes, 11.9 mmol) was added slowly dropwise to a cold (-78° C., $CO_2$(s)/acetone bath) solution of 1-bromo-4-trifluoromethylbenzene (2.750 g, 12.22 mmol) in diethyl ether (200 mL). The reaction mixture was stirred for 3 hours at -78° C. Isopropoxybis(3,5-bis(trifluoromethyl)phenyl)borane (5.910 g, 11.91 mmol) in diethyl ether (15 mL) was added slowly. The reaction mixture was allowed to warm to ambient temperature while stirring overnight to give a clear yellow solution with a trace of precipitate. The solvent was removed under reduced pressure to give a thick yellow oil. The oil was stirred at a rapid rate with hexane (100 mL) overnight (some cloudiness develops). The hexane layer was decanted off, filtered, and the volatiles were removed under reduced pressure. The oil layer was extracted again with hexane and the process was repeated several times. A small amount of oil that hadn't dissolved was discarded. The volatiles were removed under reduced pressure from the filtrate to give a yellow oil. The oil was dissolved in diethyl ether (100 mL) and trimethylsilylchloride (TMSCl, 1.5 g, 13.8 mmol) was added. Within 30 minutes copious precipitate had formed. The reaction mixture was allowed to stir overnight. The reaction mixture was filtered and the volatiles were removed under reduced pressure to give a pasty beige sludge. NMR spectra showed nearly complete reaction. The product was dissolved in ether and more TMSCl was added (0.4 mL). After stirring for several hours, the volatiles were removed under reduced pressure. The residue was extracted with benzene, filtered, and the volatiles were removed under reduced pressure to give a pasty solid. $^1$H NMR spectroscopy still showed some isopropyl groups and some ether. The residue was dissolved in ether, a small amount of TMSCl (0.2 mL) was added, and the reaction mixture was stirred for several hours. Several milliliters of THF were added and the volatiles were removed under reduced pressure. The product was extracted with benzene, filtered, and the volatiles were removed under reduced pressure to give the product as a white solid (5.370 g, 68.90%).

NMR spectra of the borane-THF complex: $^1$H NMR (400 MHz, Benzene-$d_6$) δ 7.83 (s, 4H), 7.78 (tq, J=1.7, 0.8 Hz, 2H), 7.41 (dq, J=7.4, 0.8 Hz, 2H), 7.07 (dq, J=7.5, 0.9 Hz, 2H), 3.04-2.96 (m, 4H), 0.70-0.62 (m, 4H). $^{13}$C NMR (126 MHz, Benzene-$d_6$) δ 149.08, 148.88, 134.18, 133.62 (d, J=3.8 Hz), 131.11 (q, J=32.4 Hz), 129.94 (q, J=32.1 Hz), 125.06 (d, J=272.1 Hz), 124.92 (q, J=3.8 Hz), 124.34 (q, J=272.7 Hz), 121.22 (dt, J=8.0, 4.0 Hz), 73.53, 24.10. $^{19}$F NMR (376 MHz, Benzene-$d_6$) δ-62.56 (s, 3F), -62.78 (s, 12F). $^{11}$B NMR (160 MHz, Benzene-$d_6$) δ 18.54.

Catalyst sample C3, bis(3,5-bis(trifluoromethyl)phenyl)(2,4,6-trifluorophenyl)borane THF adduct, was prepared as follows:

Preparation of Lithium Bis(Diethyletherate) Bis(3,5-Bis(Trifluoromethyl)Phenyl)(2,4,6-Trifluorophenyl)-Isopropoxyborate

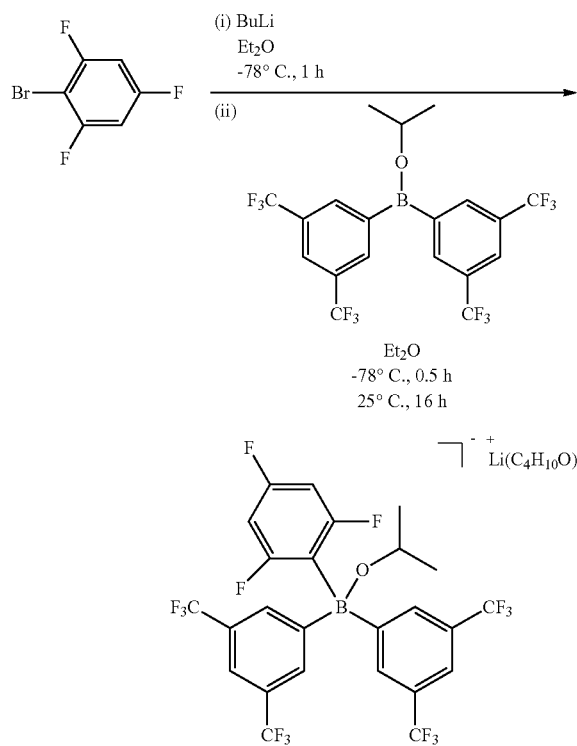

In a N$_2$-purged glove box, 2.06 g (9.78 mmol) of 1-bromo-2,4,6-trifluorobenzene was combined with 80 mL of diethyl ether in a 250-mL Schlenk flask. A Teflon-coated stir bar was added to the colorless solution and the flask was sealed with a rubber septum before being removed from the glove box. In a fume hood, the flask was connected to a nitrogen line and placed in a dry ice/acetone bath (−78° C.) for 20 minutes to chill. A 2.5 M solution of n-butyllithium in hexane (4.3 mL, 10.8 mmol) was added via syringe to the cold solution. The reaction mixture was stirred at −78° C. for 1 hour. A solution of 4.85 g of bis(3,5-bis(trifluoromethyl)phenyl)isopropoxyborane in 20 mL of diethyl ether was prepared in the glove box and drawn up into a syringe. The solution was injected into the flask containing the cold aryl lithium solution at −78° C. and the mixture was stirred for half an hour at this temperature. The dry ice/acetone bath was removed and the reaction mixture was allowed to slowly warm to room temperature while stirring overnight. Then next morning, all volatiles were removed under vacuum to yield a sticky yellow solid. The flask was returned to the glove box and the sticky yellow material was extracted with 1) 80 mL of pentane, 2) 80 mL of hexanes, and 3) 60 mL of a 50/50 ether/hexanes mixture. All three solutions were placed in the glove box freezer overnight (−40° C.) and white crystalline material precipitated from solution. The crystalline material was collected by filtration, washed with cold pentane (−40° C.), and dried under vacuum for 1 hour.

Total yield: 5.29 g (impure, approx. 5.5 mmol of desired lithium salt, 56%). It should be noted that pure material was not obtained; the lithium salt was contaminated with the isopropoxyborane starting material (12%-22% contaminated, depending on the batch of solid material collected). It was decided to proceed to the next step in the reaction without any further purification of the isolated material.

$^1$H NMR (400 MHz, Benzene-d$_6$) δ 8.26 (s, 4H, ortho-ArCH), 7.80 (s, 2H, para-ArCH), 6.22-6.07 (m, 2H, ortho-ArCH), 3.68 (hept, J=5.8 Hz, 1H, CH(CH$_3$)$_2$), 3.07 (q, J=7.1 Hz, 8H, OCH$_2$), 0.81 (t, J=7.1 Hz, 12H, OCH$_2$CH$_3$), 0.67 (d, J=6.2 Hz, 6H, CH(CH$_3$)$_2$). $^{13}$C NMR (101 MHz, Benzene-d$_6$) δ 166.2 (ddd, J=231.3, 22.4, 14.0 Hz, ArC), 162.3 (dt, J=247.1, 20.2 Hz, ArC), 159.5 (br s, ArC), 157.3 (br s, ArC), 133.8 (s, ortho-ArCH), 130.7 (q, J=31.9 Hz, ArC—CF$_3$), 125.5 (q, J=272.4 Hz, CF$_3$), 119.9 (p, J=4.0 Hz, para-ArCH), 101.0 (ddd, J=36.6, 24.0, 3.7 Hz, meta-ArCH), 65.9 (s, OCH(CH$_3$)$_2$), 65.8 (s, OCH$_2$CH$_3$), 25.7 (s, OCH(CH$_3$)$_2$), 14.7 (s, OCH$_2$CH$_3$). $^{19}$F NMR (376 MHz, Benzene-d$_6$) δ -62.7 (s, 12F, CF$_3$), −104.4 (br s, 2F, ortho-ArF), −112.3 (m, 1F, para-ArF).

Preparation of Bis(3,5-Bis(Trifluoromethyl)Phenyl)(2,4,6-Trifluoroborane

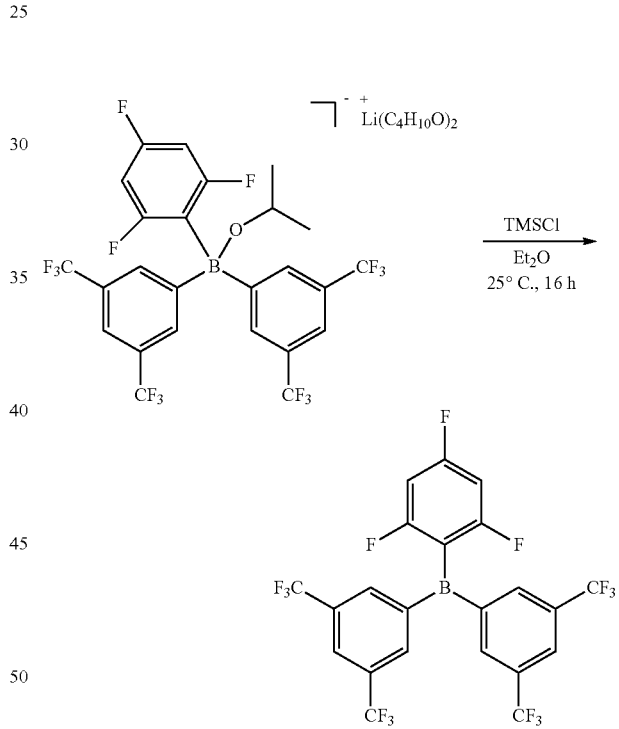

In a N$_2$-purged glove box, 3.30 g (78% pure, 3.29 mmol) of the lithium borate salt was dissolved in 60 mL of diethyl ether to form a colorless solution (note: the lithium borane salt was contaminated with 22% bis(3,5-bis(trifluoromethyl)phenyl)isopropoxyborane). Trimethylsilylchloride (1.0 mL, 7.9 mmol) was added with stirring to the solution at room temperature. There was no immediate sign of a reaction. The mixture was allowed to stir overnight at room temperature. The next morning, a copious amount of LiCl precipitate had formed in the flask. An aliquot of the reaction mixture was removed and analyzed by $^{19}$F NMR spectroscopy to confirm that the reaction had gone to completion. The reaction mixture was filtered through Celite to remove LiCl and the filtrate was pumped down to dryness. The resultant sticky white solid was extracted with 80-90 mL of hexanes and filtered again. The hexanes solution was placed in the glove box freezer overnight (−40° C.), during which time a white microcrystalline solid precipitated. The solid was collected by filtration, washed with 5-10 mL of cold pentane (−40° C.), and dried under vacuum for 1 hour. Multinuclear NMR spectroscopy confirmed formation of the desired material in pure form. Yield: 0.992 g, 1.75 mmol, 53.2%.

$^1$H NMR (400 MHz, Benzene-$d_6$) δ 7.88 (s, 6H, ArCH on $CF_3$-substituted ring), 6.03 (m, 2H, ArCH on 2,4,6-trifluorophenyl ring). $^{13}$C NMR (101 MHz, Benzene-$d_6$) δ 167.4 (dt, J=257.6, 16.2 Hz, para-ArCF), 166.2 (dt, J=253.5, 15.2 Hz, ortho-ArCF), 142.8 (br s, ArC), 137.5 (d, J=3.0 Hz, ortho-ArCH), 132.1 (q, J=33.4 Hz, ArC—$CF_3$), 126.9 (pent, J=4.0 Hz, para-ArCH), 124.1 (q, J=273.0 Hz, $CF_3$), 112.6 (br s, ArC), 101.6 (ddd, J=29.0, 24.9, 3.7 Hz, meta-ArCH). $^{19}$F NMR (376 MHz, Benzene-$d_6$) δ-63.1 (s, 12F, $CF_3$), −92.4 (m, 2F, ortho-ArCF), −98.5 (s, 1F, para-ArCF). $^{11}$B NMR (160 MHz, Benzene-$d_6$) δ 62.9 (broad s).

Preparation of THF Adduct of Bis(3,5-Bis(Trifluoromethyl)Phenyl)(2,4,6-Trifluoroborane

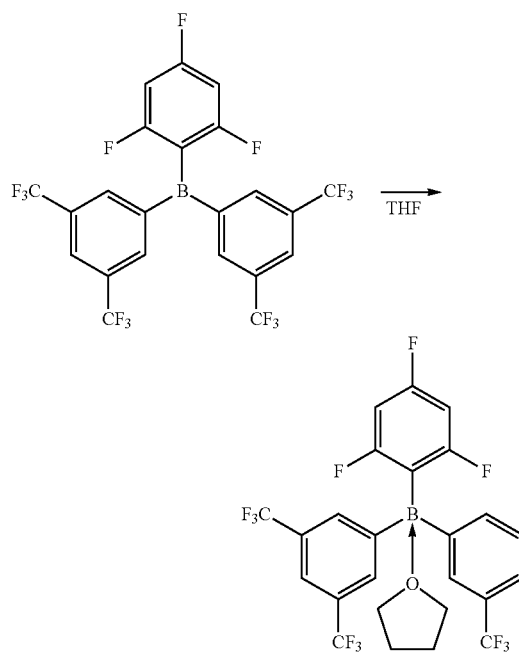

In a $N_2$-purged glove box, 0.992 g (1.75 mmol) of bis(3,5-bis(trifluoromethyl)phenyl)(2,4,6-trifluorophenyl) borane was weighed into a 110-mL glass jar and dissolved in 50 mL of THF. The THF was removed under vacuum with stirring to yield a white solid. The solid was triturated with 40 mL of pentane to help remove any uncoordinated THF. The white solid was characterized by multinuclear NMR spectroscopy as the mono-THF adduct of bis(3,5-bis(trifluoromethyl)phenyl)(2,4,6-trifluoro-phenyl)borane. Yield: 0.969 g, 1.51 mmol, 86.3%.

$^1$H NMR (400 MHz, Benzene-$d_6$) δ 7.96 (s, 4H, ortho-ArCH), 7.79 (s, 2H, para-ArCH), 6.16 (t, J=8.0 Hz, 2H, meta-ArCH), 3.10 (m, 4H, $OCH_2$), 0.79 (m, 4H, $CH_2$). $^{13}$C NMR (101 MHz, Benzene-$d_6$) δ 165.3 (ddd, J=245.4, 17.7, 14.3 Hz, ortho-ArCF), 163.9 (dd, J=249.5, 16.2 Hz, para-ArCF), 148.4 (br s, ArC), 134.0 (s, ortho-ArCH), 131.4 (q, J=32.4 Hz, ArC—$CF_3$), 121.8 (m, para-ArCH), 124.8 (q, J=272.7 Hz, $CF_3$), 101.3 (ddd, J=32.8, 24.2, 3.2 Hz, meta-ArCH), 72.6 (s, $OCH_2$), 24.8 (s, $CH_2$). $^{19}$F NMR (376 MHz, Benzene-$d_6$) δ-62.8 (s, 12F, $CF_3$), −96.9 (s, 2F, ortho-ArCF), −108.5 (s, 1F, para-ArCF). $^{11}$B NMR (160 MHz, Benzene-$d_6$) δ 13.2 (broad s).

Catalyst sample C4, bis(3,5-bis(trifluoromethyl)phenyl) (2,6-difluorophenyl) THF adduct, was prepared as follows:

Preparation of Lithium Bis(Diethyletherate) Bis(3, 5-Bis(Trifluoromethyl)Phenyl)(2,6-Difluorophenyl)-Isopropoxy Borate

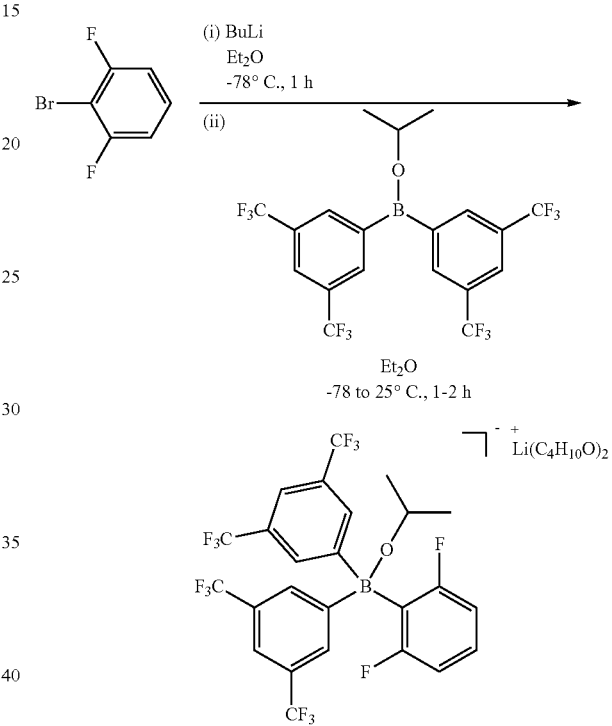

n-Butyllithium (3.00 mL, 2.48 M in hexanes, 7.44 mmol) was added slowly dropwise to a cold (−78° C., $CO_2$(s) bath) solution of 1-bromo-2,6-difluorobenzene (1.46 g, 7.56 mmol) in diethyl ether (100 mL). The reaction mixture was stirred for 1 hour at −78° C. and then a solution of bis(3,5-bis(trifluoromethyl)phenyl)isopropoxyborane (3.69 g, 7.44 mmol) in ether (10 mL) was added slowly. Precipitate formed while the reaction mixture was allowed to warm to ambient temperature. By the time the reaction mixture had reached room temperature, the precipitate had dissolved to give a clear solution which was stirred for several hours. The solution was filtered and the volatiles were removed under reduced pressure to give a crystalline-appearing solid. The solid was dissolved in a minimum of boiling ether and the solution was placed in the glove box freezer (−33° C.). After cooling overnight, the supernatant was decanted from the crystals which had formed. The crystals were dried under reduced pressure. Yield: 6.85 g, 88.4%.

$^1$H NMR (400 MHz, Benzene-$d_6$) δ 8.31 (s, 4H), 7.77 (tt, J=2.0, 0.9 Hz, 2H), 6.60 (dq, J=8.8, 7.5 Hz, 1H), 6.47-6.41 (m, 2H), 3.71 (hept, J=6.2 Hz, 1H), 3.05 (qd, J=7.1, 0.7 Hz, 8H), 0.82 (td, J=7.1, 0.6 Hz, 12H), 0.68 (d, J=6.2 Hz, 6H). $^{13}$C NMR (126 MHz, Benzene-$d_6$) δ164.45 (dd, J=249.6, 11.3 Hz), 142.11, 137.21, 136.78 (t, J=3.8 Hz), 135.51 (t, J=10.8 Hz), 131.28 (q, J=33.3 Hz), 126.10 (p, J=3.8 Hz), 123.30 (q, J=273.1 Hz), 111.72-111.40 (m), 73.82, 65.57, 15.11, 2.57. $^{19}$F NMR (376 MHz, Benzene-d$_6$) δ-62.64, −106.66. $^{11}$B NMR (160 MHz, Benzene-d$_6$) δ 0.68 (s).

Preparation of THF Adduct of Bis(3,5-Bis(Trifluoromethyl)Phenyl)(2,6-Difluorophenyl)Borane

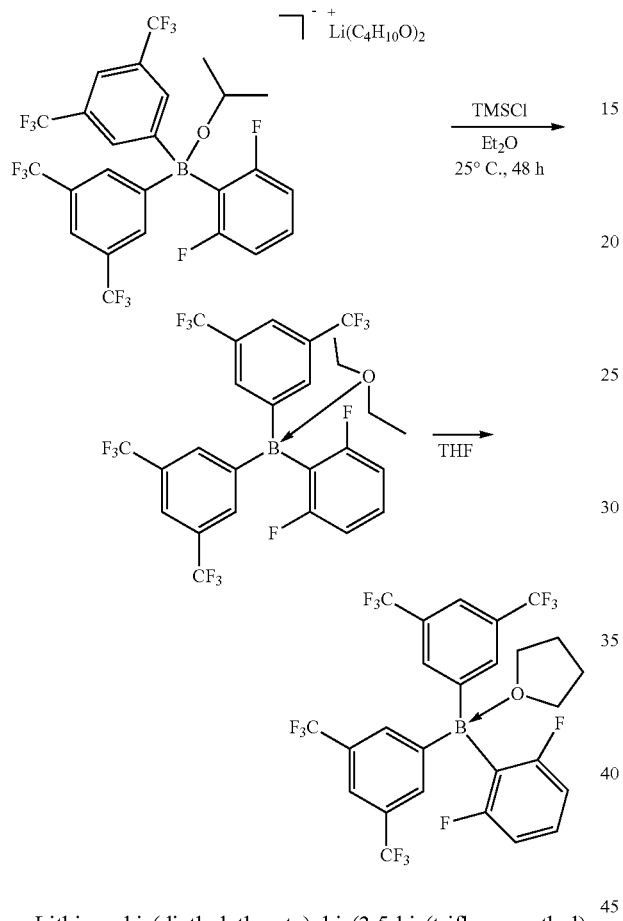

Lithium bis(diethyletherate) bis(3,5-bis(trifluoromethyl)phenyl)(2,6-difluorophenyl)isopropoxyborate (5.85 g, 10.6 mmol) was dissolved in ether (150 mL) and chlorotrimethylsilane (3.00 mL, 23.6 mmol) was added to the solution at ambient temperature. Precipitate began to form within 15 minutes. The reaction mixture was allowed to stir over the weekend. By Monday, the volatiles had evaporated away (non-sealed container). The colorless solid was extracted with ether and filtered. The volatiles were removed under reduced pressure to give the product as a colorless solid, 4.98 g. NMR spectra showed clean borane, but with only about 86% of the required ether for a mono etherate complex. The product was dissolved in ether to give a hazy solution. THF (6 mL) was added and the solution became crystal clear. The volatiles were removed under reduced pressure to give a glassy solid. The residue was extracted with benzene, filtered, and the volatiles were removed under reduced pressure to give a white solid. Yield: 4.63 g, 69.9%.

$^1$H NMR (400 MHz, Benzene-d$_6$) δ 8.02 (d, J=1.8 Hz, 2H), 7.77 (dq, J=1.9, 0.9 Hz, 1H), 6.71-6.60 (m, OH), 6.48 (t, J=8.4 Hz, 1H), 3.17-3.09 (m, 2H), 0.77-0.68 (m, 2H). $^{13}$C NMR (101 MHz, Benzene-d$_6$) δ 164.82 (dd, J=243.3, 14.1 Hz), 147.95, 133.82, 133.30, 130.91 (d, J=32.4 Hz), 124.41 (q, J=272.8 Hz), 121.40 (q, J=3.9 Hz), 112.57-111.60 (m), 73.58, 24.03 (d, J=3.3 Hz). $^{19}$F NMR (376 MHz, Benzene-d$_6$) δ-62.80, −99.69 (t, J=7.5 Hz). $^{11}$B NMR (160 MHz, Benzene-d$_6$) δ 12.2 (s).

Catalyst Sample C5, bis(3,5-bis(trifluoromethyl)phenyl)(2,5-bis(trifluoromethyl)phenyl)borane, was prepared as follows:

Preparation of Lithium Isopropoxy Bis(3,5-Bis(Trifluoromethyl)Phenyl)(2,5-Bis(Trifluoromethyl)Phenyl)Borate

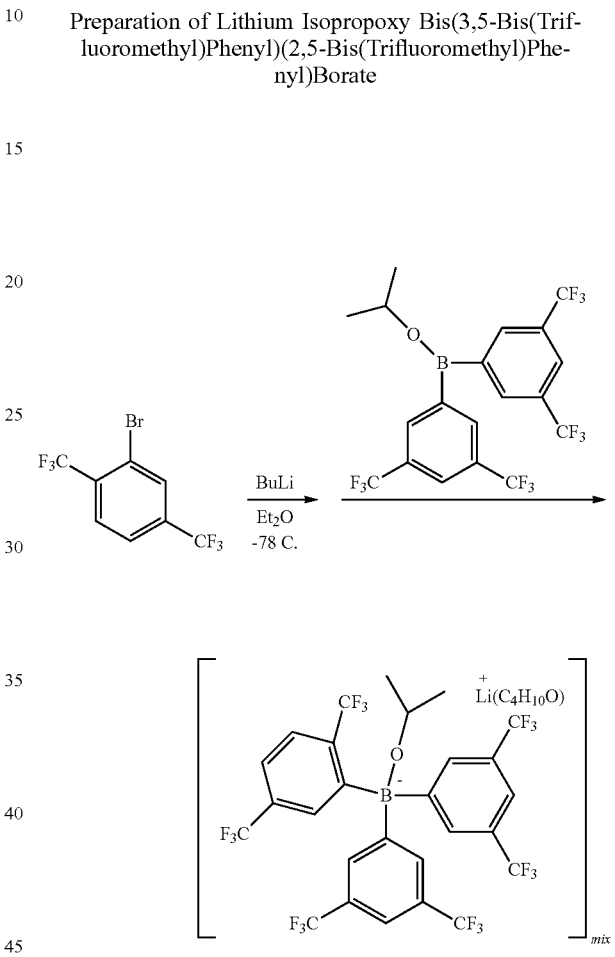

n-Butyllithium (4.00 mL, 2.535 M in hexanes, 10.14 mmol) was added slowly to a cold (−78° C., CO$_2$(s) bath) solution of 1-bromo-2,5-bis(trifluoromethyl)benzene (3.00 g, 10.24 mmol) in diethyl ether (200 mL). The reaction mixture was stirred for 1 hour at −78° C. Isopropoxy-bis(3,5-bis(trifluoromethyl)phenyl)borane (5.036 g, 10.15 mmol) in ether (18 mL) was added slowly. The reaction mixture was stirred for several hours at −78° C. The solution was warmed to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 7.88 g, 98.3%.

$^1$H NMR (400 MHz, Benzene-d$_6$) δ 8.06 (s, 1H), 8.00 (s, 4H), 7.70 (dt, J=1.8, 0.9 Hz, 2H), 7.40 (d, J=8.3 Hz, 1H), 7.19 (d, J=8.4 Hz, 1H), 3.79 (hept, J=6.1 Hz, 1H), 2.78 (q, J=7.1 Hz, 4H), 0.73 (d, J=6.1 Hz, 6H), 0.54 (t, J=7.1 Hz, 6H). $^{13}$C NMR (101 MHz, Benzene-d$_6$) δ 158.31, 153.97, 135.44 (q, J=3.7 Hz), 135.23, 133.55 (t, J=4.1 Hz), 133.25, 133.18, 132.37 (d, J=97.8 Hz), 130.92 (q, J=32.0 Hz), 127.80 (q, J=273.9 Hz), 124.92 (q, J=272.5 Hz), 124.66 (q, J=272.8 Hz), 123.86 (q, J=3.8 Hz), 119.86 (p, J=3.9 Hz), 66.24, 66.17, 25.60, 13.94. $^{19}$F NMR (376 MHz, Benzene-d$_6$) δ-55.30--55.51 (m), -62.82, -63.61. $^{11}$B NMR (160 MHz, Benzene-d$_6$) δ 2.16.

Preparation of Bis(3,5-Bis(Trifluoromethyl)Phenyl)(2,5-Bis(Trifluoromethyl)Phenyl)Borane Lithium(diethyletherate) isopropoxy-bis(3,5-bis(trifluoromethyl)phenyl)(2,5-bis(trifluoromethyl)phenyl)-borate (7.88 g, 9.97 mmol) was dissolved in ether (150 mL). Chlorotrimethylsilane (2.6 mL, 20.5 mmol) was added. The reaction mixture was allowed to stir overnight to give a yellow solution with colorless precipitate. The volatiles were removed under reduced pressure. The residue was extracted with hexane (100 ml). The mixture was filtered and the volatiles were concentrated under reduced pressure. The solution was cooled in the freezer (-33° C.) overnight. The reaction mixture was filtered and the precipitate was dried under reduced pressure to give a white powder. Yield: 6.0182 g, 92.84%.

THF-free compound: $^1$H NMR (400 MHz, Benzene-d$_6$) δ 7.87 (s, 2H), 7.85 (s, 4H), 7.29 (s, 1H), 7.11 (d, J=1.2 Hz, 2H). $^{13}$C NMR (126 MHz, Benzene-d$_6$) δ 140.87, 140.75, 137.49 (d, J=3.8 Hz), 135.11 (q, J=31.7 Hz), 133.26 (q, J=33.0 Hz), 132.03 (q, J=33.6 Hz), 128.29, 127.34 (q, J=3.8 Hz), 127.11 (q, J=4.0 Hz), 127.01 (q, J=4.0 Hz), 124.46 (q, J=274.3 Hz), 123.70 (q, J=273.2 Hz), 123.49 (q, J=272.9 Hz). $^{19}$F NMR (376 MHz, Benzene-d$_6$) δ-56.98, -63.43, -63.47. $^{11}$B NMR (160 MHz, Benzene-d$_6$) δ 64.37.

Catalyst Sample C6, (3,5-bis(trifluoromethyl)phenyl)bis(2,5-bis(trifluoromethyl)phenyl)borane, was prepared as follows:

Preparation of Lithium Diisopropoxy (3,5-Bis(Trifluoromethyl)Phenyl)(2,5-Bis(Trifluoromethyl)Phenyl)Borate

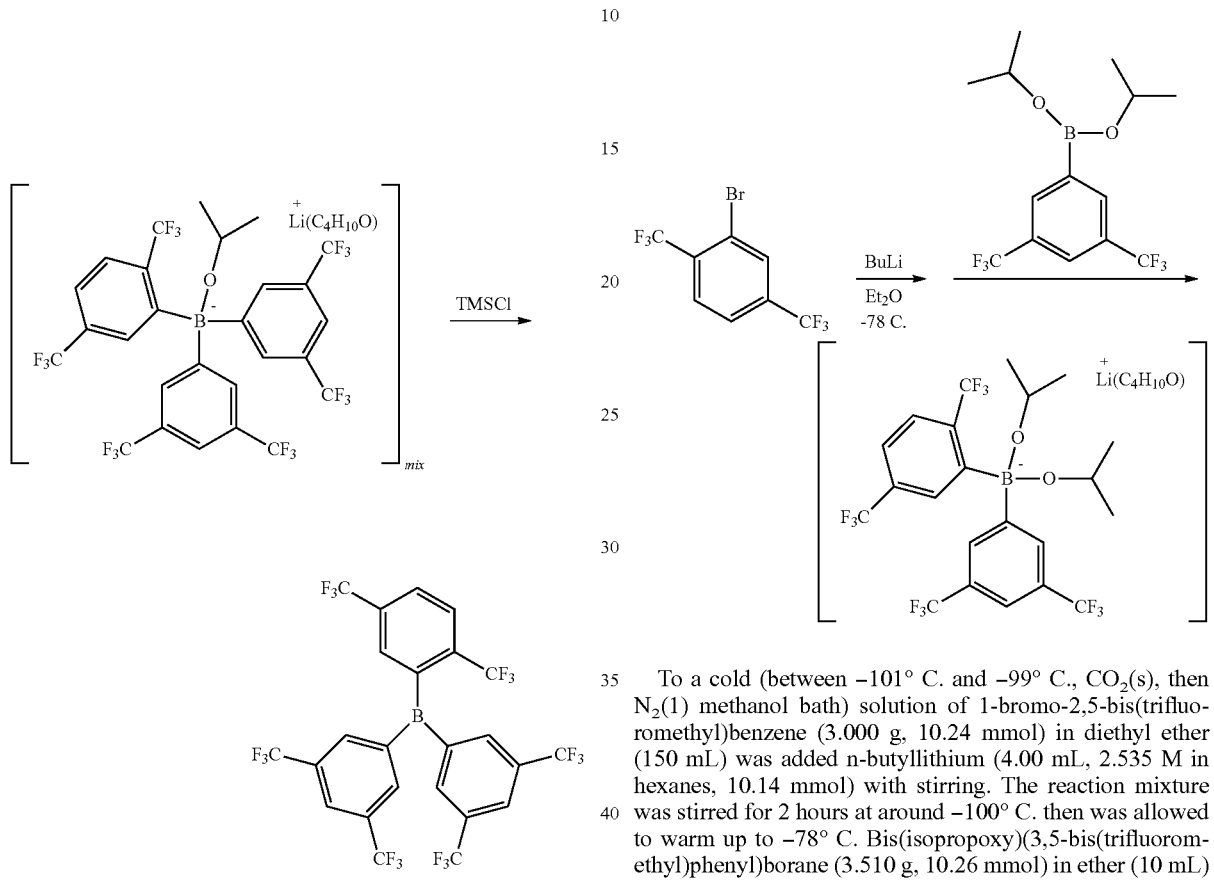

To a cold (between -101° C. and -99° C., CO$_2$(s), then N$_2$(l) methanol bath) solution of 1-bromo-2,5-bis(trifluoromethyl)benzene (3.000 g, 10.24 mmol) in diethyl ether (150 mL) was added n-butyllithium (4.00 mL, 2.535 M in hexanes, 10.14 mmol) with stirring. The reaction mixture was stirred for 2 hours at around -100° C. then was allowed to warm up to -78° C. Bis(isopropoxy)(3,5-bis(trifluoromethyl)phenyl)borane (3.510 g, 10.26 mmol) in ether (10 mL) was added slowly. The reaction mixture was allowed to warm to ambient temperature while stirring overnight. The volatiles were removed from the pale-yellow nearly clear solution under reduced pressure to give a crystalline-appearing solid. The solid was dissolved in ether (10 mL) and placed in the freezer. Nothing precipitated. The ether was evaporated and the yellow solid was dissolved in hexane, filtered, and concentrated under a nitrogen stream to give crystalline solid. The supernatant was removed and the solid was dried under reduced pressure. Yield of colorless crystals from the first crop: 3.318 g. NMR analysis of the crystals showed pure desired compound. The supernatant was placed in the freezer overnight. Crystalline matter formed. The supernatant was pipetted out and discarded. The crystalline residue was dried under reduced pressure: 2.017 g. Total yield: 5.335 g, 82.79%.

$^1$H NMR (400 MHz, Benzene-d$_6$) δ 8.39 (s, 2H), 8.26 (s, 1H), 7.90 (dq, J=1.8, 0.9 Hz, 1H), 7.56 (d, J=8.2 Hz, 1H), 7.27 (ddt, J=7.9, 1.7, 0.8 Hz, 1H), 3.18 (hept, J=6.0 Hz, 2H), 2.92 (q, J=7.1 Hz, 4H), 0.89 (t, J=7.1 Hz, 6H), 0.78 (d, J=6.1 Hz, 6H), 0.68 (d, J=6.0 Hz, 6H). $^{13}$C NMR (101 MHz, Benzene-d$_6$) δ 153.10, 136.65 (q, J=29.6 Hz), 134.81 (dd, J=2.7 Hz, 1.9 Hz), 133.93 (q, J=3.6 Hz), 131.93 (q, J=31.6 Hz), 131.35, 129.76 (q, J=31.9 Hz), 127.26 (q, J=274.6 Hz), 125.17 (d, J=272.4 Hz), 124.89 (q, J=272.8 Hz), 123.25 (q, J=3.9 Hz), 119.89 (p, J=3.9 Hz), 66.42, 64.08, 25.49, 24.57, 14.36. $^{19}$F NMR (376 MHz, Benzene-d$_6$) δ-55.79, −62.66, −63.30. $^{11}$B NMR (160 MHz, Benzene-d$_6$) δ 5.32.

Preparation of Isopropoxy (3,5-Bis(Trifluoromethyl) Phenyl)(2,5-Bis(Trifluoromethyl)Phenyl)Borane Preparation of Lithium Isopropoxy Bis(2,5-Bis(Trifluoromethyl)Phenyl)(3,5-Bis(Trifluoromethyl)Phenyl)Borate

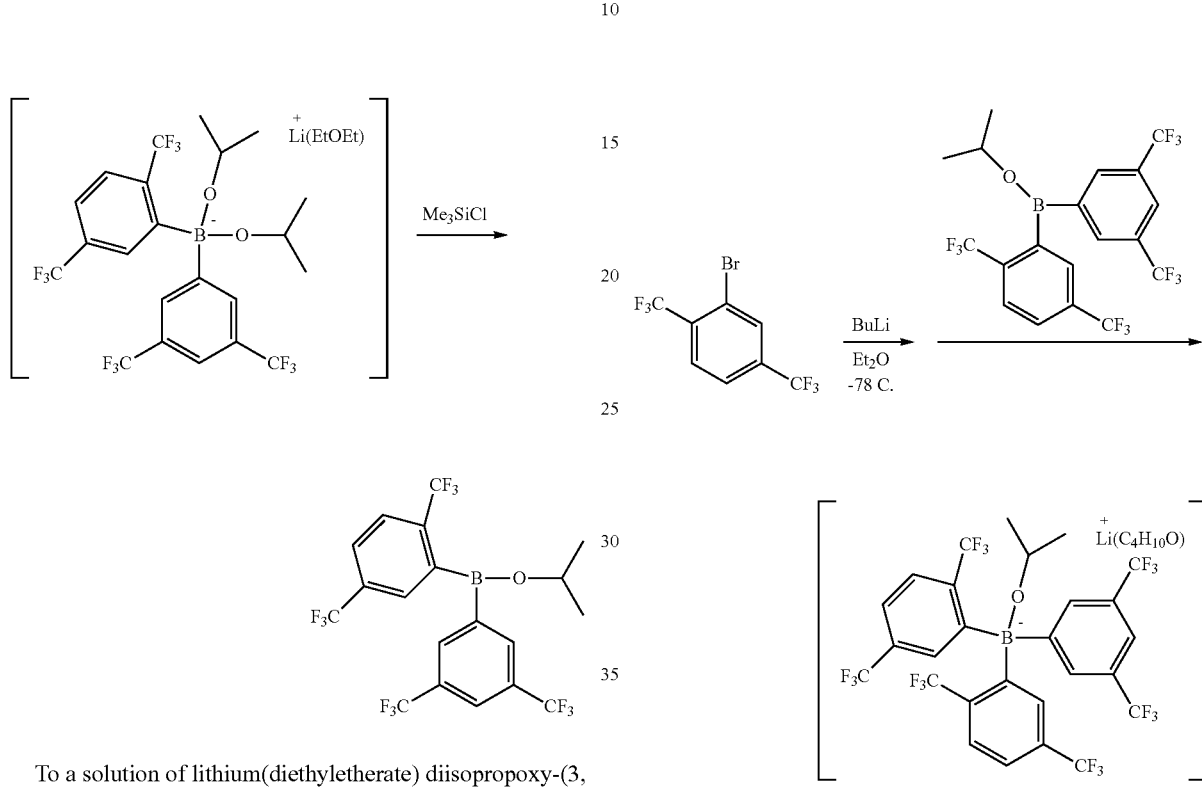

To a solution of lithium(diethyletherate) diisopropoxy-(3,5-bis(trifluoromethyl)phenyl)(2,5-bis(trifluoromethyl)phenyl)borate (3.318 g, 5.21 mmol) in ether (10 mL) was added chlorotrimethylsilane (2.0 mL) with rapid formation of precipitate. The reaction mixture was allowed to stir overnight. The reaction mixture was filtered and the volatiles were removed under reduced pressure. NMR analysis showed the reaction was complete. Some putative TMS-O-iPr ether was present, too. The second crop of lithium diisopropoxy (3,5-bis(trifluoromethyl)phenyl)(2,5-bis(trifluoromethyl)phenyl)borate prepared as described above was treated similarly (2.017 g, 3.17 mmol, of lithium salt; 2.0 mL of TMSCl) and stirred for 3 hours. The total amount of combined reagents: 5.335 g, 8.39 mmol; TMSCl: 4.0 mL, 31.6 mmol. The second reaction mixture was filtered and combined with the first reaction product. The volatiles were removed under reduced pressure. The residue was extracted with hexane, filtered, and the volatiles were removed overnight at 40° C. under reduced pressure to give the product as a yellow oil, 3.4703 g, 83.42%.

$^1$H NMR (400 MHz, Benzene-d$_6$) δ 8.05 (d, J=1.8 Hz, 2H), 7.80 (d, J=2.3 Hz, 1H), 7.34 (d, J=1.9 Hz, 1H), 7.12 (d, J=6.5 Hz, 1H), 7.10 (d, J=6.7 Hz, 1H), 3.78 (hept, J=6.1 Hz, 1H), 0.85 (d, J=6.1 Hz, 6H). $^{13}$C NMR (101 MHz, Benzene-d$_6$) δ 139.07, 136.28, 135.37 (q, J=31.8 Hz), 134.93 (d, J=3.9 Hz), 133.49 (q, J=32.7 Hz), 131.50 (q, J=33.0 Hz), 127.87, 126.95 (dq, J=7.5, 3.7 Hz), 126.46 (q, J=3.7 Hz), 125.41 (hex, J=3.8 Hz), 124.57 (q, J=273.9 Hz), 123.98 (q, J=272.8 Hz), 123.90 (q, J=273.0 Hz), 72.49, 23.71. $^{19}$F NMR (376 MHz, Benzene-d$_6$) δ-60.31, −63.27 (d, J=3.3 Hz), −63.47 (d, J=3.3 Hz). $^{11}$B NMR (160 MHz, Benzene-d$_6$) δ 41.28.

n-Butyllithium (2.40 mL, 2.535 M in hexanes, 6.08 mmol) was added slowly to a cold (−78° C., CO$_2$(s) bath) solution of 1-bromo-2,5-bis(trifluoromethyl)benzene (1.800 g, 6.14 mmol) in diethyl ether (150 mL). The reaction mixture was stirred for 1 hour at −78° C. Isopropoxy(2,5-bis(trifluoromethyl)phenyl)(3,5-bis(trifluoromethyl)phenyl)borane (3.022 g, 6.09 mmol) in ether (18 mL) was added slowly. The reaction mixture was stirred for several hours at −78° C. The solution was allowed to warm to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 4.21 g, 87.6%.

$^1$H NMR (400 MHz, Benzene-d$_6$) δ 8.30 (s, 2H), 8.12 (s, 2H), 7.65 (dt, J=1.7, 0.9 Hz, 1H), 7.27 (d, J=8.2 Hz, 2H), 7.08 (d, J=8.2 Hz, 2H), 3.87 (hept, J=6.2 Hz, 1H), 2.91 (q, J=7.1 Hz, 4H), 0.65 (d, J=6.2 Hz, 6H), 0.63 (t, J=7.1 Hz, 6H). $^{13}$C NMR (101 MHz, Benzene-d$_6$) δ 157.17, 156.73, 134.42, 133.88 (q, J=3.6 Hz), 133.04 (d, J=28.4 Hz), 132.88 (q, J=32.1 Hz), 129.95 (q, J=31.9 Hz), 127.74 (q, J=273.6 Hz), 127.33 (q, J=6.9 Hz), 124.97 (q, J=272.4 Hz), 124.50 (q, J=273.0 Hz), 122.72 (q, J=3.8 Hz), 118.78 (p, J=4.1 Hz), 65.88, 65.34, 25.11, 13.91. $^{19}$F NMR (376 MHz, Benzene-d$_6$) δ-56.31, −62.89, −63.76. $^{11}$B NMR (160 MHz, Benzene-d$_6$) δ 2.98.

Preparation of Bis(2,5-Bis(Trifluoromethyl)Phenyl)(3,5-Bis(Trifluoromethyl)Phenyl)Borane

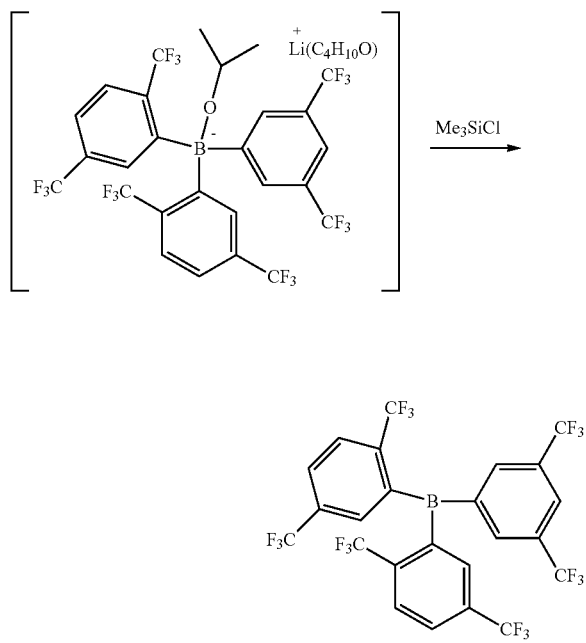

To a solution of lithium(diethyletherate) isopropoxy-bis(2,5-bis(trifluoromethyl)phenyl)(3,5-bis(trifluoromethyl)phenyl)borate (3.915 g, 4.95 mmol) in diethyl ether (150 mL) was added chlorotrimethylsilane (1.10 mL, 10.1 mmol) with stirring. Within 15 minutes, precipitate formed in solution. The reaction mixture was stirred overnight. The mixture was filtered and the volatiles were removed under reduced pressure to give a colorless solid, 3.260 g. The product was extracted with hexane, filtered, and the volatiles were removed under reduced pressure to give the product as a pale solid, 3.109 g, 96.53%.

$^1$H NMR (500 MHz, Benzene-d$_6$) δ 7.90 (s, 1H), 7.83 (s, 1H), 7.66 (s, 3H), 7.09 (s, 5H), 7.09 (s, 5H). $^{13}$C NMR (126 MHz, Benzene-d$_6$) δ 141.54, 140.05, 138.35 (q, J=3.8 Hz), 135.84 (q, J=32.0 Hz), 133.02 (q, J=33.0 Hz), 132.02 (q, J=33.7 Hz), 129.98 (q, J=3.5 Hz), 128.29, 127.91 (d, J=2.4 Hz), 127.13 (q, J=4.2 Hz), 124.15 (q, J=274.2 Hz), 123.70 (q, J=273.2 Hz), 123.37 (q, J=273.2 Hz). $^{19}$F NMR (470 MHz, Benzene-d$_6$) δ-56.40, -63.31, -63.58. $^{11}$B NMR (160 MHz, Benzene-d$_6$) δ 67.58.

Catalyst Sample C7 was prepared as follows:

Preparation of Tris(2,5-Bis(Trifluoromethyl)Phenyl)Borane

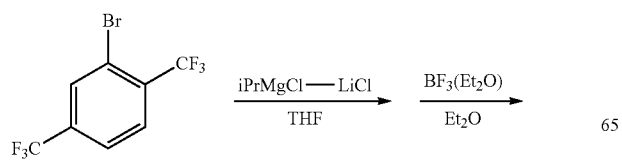

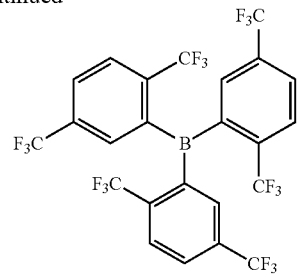

This reaction was carried out in a manner similar to a previously reported procedure.[2] Isopropylmagnesium chloride-lithium chloride (46.0 mL, 58.0 mmol, 1.26 M solution in THF) was added to a solution of 1-bromo-2,5-bis(trifluoromethyl)benzene (17.05 g, 58.2 mmol) in THF (250 mL) which was in an acetone bath cooled with dry ice (-76° C.). After the addition was complete, the reaction flask was transferred to an ice bath (0° C.) and the reaction mixture was stirred for 2 hours. The reaction mixture was cooled to -78° C. and boron trifluoride diethyletherate (2.43 mL, 2.74 g, 19.3 mmol) in 15 mL of ether was added. The reaction mixture was allowed to warm to room temperature while it was stirred over the weekend. The volatiles were removed from the solution to give a reddish solid, 12.77 g. The residue was extracted with toluene and filtered. The volatiles were removed under reduced pressure to give a pink powder, 10.75 g. The solids were extracted with methylene chloride to give a light violet solution. The solution was placed overnight in the freezer. The supernatant was decanted from the very light pinkish crystalline material which formed. The material was dried overnight under reduced pressure. Yield: 7.0003 g, 55.73%.

TH-free product: $^1$H NMR (400 MHz, Benzene-d$_6$) δ 7.57 (s, 1H), 7.13 (s, 3H), 7.08 (dd, J=8.3, 1.8 Hz, 3H). $^{13}$C NMR (101 MHz, Benzene-d$_6$) δ 141.10, 136.50 (q, J=32.2 Hz), 132.81 (q, J=33.1 Hz),

[2] Herrington, T. J.; Thom, A. J. W.; White, A. J. P.; Ashley, A. E. Dalton Trans. 2012, 41, 9019. 131.59 (q, J=3.8 Hz), 128.85 (q, J=3.7 Hz), 127.45 (q, J=3.4, 2.1 Hz), 123.93 (q, J=274.6 Hz), 123.59 (q, J=273.1 Hz). $^{19}$F NMR (376 MHz, Benzene-d$_6$) δ-56.48, -63.77. $^{11}$B NMR (160 MHz, Benzene-d$_6$) δ 68.81.

Catalyst sample C8, bis(3,5-bis(trifluoromethyl)phenyl)(2,3,5,6-tetrafluoro-4-trifluoromethylphenyl)borane THF adduct, was prepared as follows:

Preparation of Lithium(Tetrahydrofuranate) Bis(3,5-Bis(Trifluoromethyl)Phenyl)(2,3,5,6-Tetrafluoro-4-Trifluoromethylphenyl)Isopropoxyborate

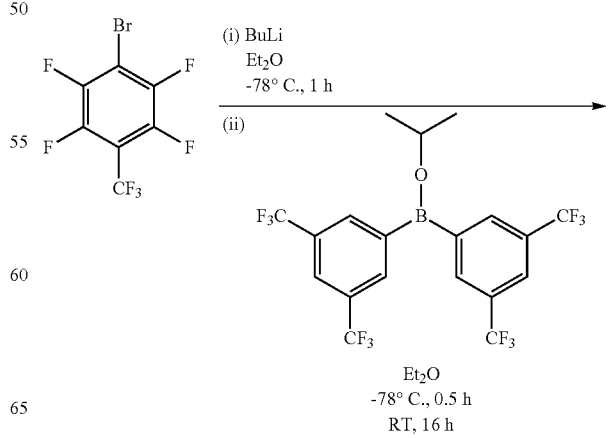

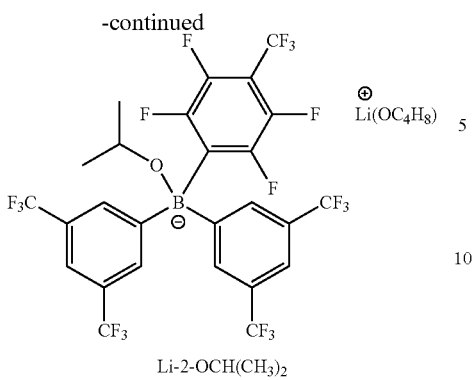

Li-2-OCH(CH₃)₂

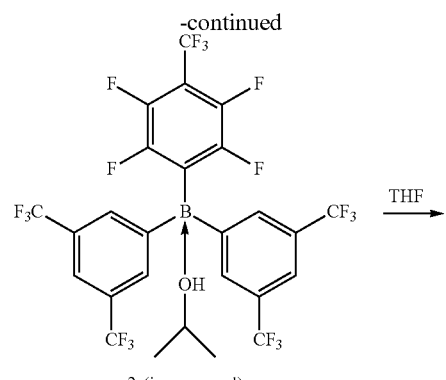

2·(isopropanol)

[structure]

2·(THF)

n-Butyllithium (3.00 mL, 2.54 M in hexanes, 7.61 mmol) was added to a cold (between −101° C. and −99° C., CO₂(s), then N₂(l) methanol bath) solution of 1-bromo-2,3,5,6-tetrafluoro-4-trifluoromethylbenzene (2.26 g, 7.61 mmol) in diethyl ether (100 mL) with stirring. The reaction mixture was stirred for 2 hours at −100° C. then was allowed to warm up to −76° C. Bis(3,5-bis(trifluoromethyl)phenyl)isopropoxy-borane (3.78 g, 7.61 mmol) in ether (10 mL) was added slowly to the reaction mixture. The reaction mixture was allowed to warm slowly to ambient temperature while stirring overnight. The next day, the pale-yellow, nearly clear solution was filtered and the volatiles were removed from the filtrate under reduced pressure to give a crystalline-appearing solid. The solid was washed with hexane, filtered, and dried under reduced pressure. An aliquot of the solid was removed for NMR analysis. It had limited solubility in benzene. The aliquot was dissolved in THF and the volatiles were removed under reduced pressure and then analyzed again by NMR in benzene. Yield: 6.16 g, 93.2%.

$^1$H NMR (500 MHz, Benzene-$d_6$) δ 8.32 (s, 4H), 7.85 (s, 2H), 3.47 (h, J=6.2 Hz, 1H), 3.26-3.17 (m, 4H), 1.24-1.16 (m, 4H), 0.55 (d, J=6.2 Hz, 6H). $^{13}$C NMR (126 MHz, Benzene-$d_6$) δ 144.07 (d, J=259.4 Hz), 134.41, 133.82, 133.48 (d, J=187.5 Hz), 130.59 (q, J=32.2 Hz), 130.45 (q, J=31.8 Hz), 126.40-123.43 (m), 125.84, 124.97 (q, J=272.4 Hz), 119.94 (p, J=4.0 Hz), 118.92 (d, J=190.9 Hz), 109.57 (d, J=22.7 Hz), 68.38, 65.30, 25.64, 25.13. $^{19}$F NMR (470 MHz, Benzene-$d_6$) δ-56.26 (t, J=20.7 Hz), −62.59, −137.04, −141.73. $^{11}$B NMR (160 MHz, Benzene-$d_6$) δ 1.20.

Preparation of Bis(3,5-Bis(Trifluoromethyl)Phenyl) (2,3,5,6-Tetrafluoro-4-Trifluoromethylphenyl)Borane Tetrahydrofuranate, THF Adduct

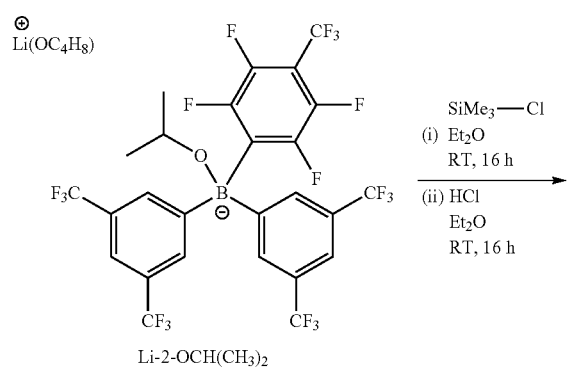

Li-2-OCH(CH₃)₂

To a solution of lithium(tetrahydrofuranate) bis(3,5-bis(trifluoromethyl)phenyl)(2,3,5,6-tetrafluoro-4-(trifluoromethyl)phenyl)isopropoxyborate (6.16 g, 7.10 mmol) in diethyl ether (100 mL) was added chlorotrimethylsilane (2.00 mL, 18.4 mmol) with stirring. The reaction mixture was stirred overnight. The next day, analysis of an aliquot of the reaction mixture by $^{19}$F NMR spectroscopy revealed that no reaction had occurred. Hydrogen chloride solution in ether (7.00 mL, 2.0 M, 14.0 mmol) was added and the reaction mixture was stirred overnight. The next day, analysis of an aliquot of the reaction mixture by $^{19}$F NMR spectroscopy revealed that the reaction was complete. The mixture was filtered and the volatiles were removed from the filtrate under reduced pressure. The resultant residue was dissolved in toluene, filtered, and the volatiles were removed from the filtrate under reduced pressure to give 4.50 g of crude product. The colorless, pasty solid was washed with hexane and filtered to give a colorless powder, which was dried under reduced pressure. NMR analysis of the powder revealed that one molecule of isopropanol remained in the coordination sphere of the borane. Yield of the borane as a isopropanol adduct: 2.45 g, 52.8%.

A portion of the borane isopropanol adduct (1.811 g) was dissolved in ether (40 mL) and THF (10 mL) was added to the solution. The solution was allowed to evaporate slowly to give large crystals. The supernatant was removed, and the very pale, yellow crystals were washed with hexane. The crystals were dried under reduced pressure (1.08 g). The crystals were analyzed by X-ray crystallography and found to be the borane isopropanol adduct. The THF had not displaced the coordinated alcohol. The supernatant solution from the crystals and the hexane washings were combined and concentrated under vacuum to give a second crop of crystals (0.422 g). The second crop of crystals was washed and dried in the same manner as the first crop. NMR analysis showed the presence of coordinated isopropanol, but little or no THF. THF was added and then the volatiles were removed under reduced pressure. NMR analysis showed the presence of THF, but still some isopropanol. The solid was dissolved in THF and then pumped off. This was repeated five more times to give the THF adduct of the product as a white powder. Yield: 0.413 g, 22.4%.

THF adduct:

$^1$H NMR (400 MHz, Benzene-$d_6$) δ 7.87 (s, 4H), 7.80 (s, 4H), 3.02-2.93 (m, 4H), 0.78-0.72 (m, 4H). $^{13}$C NMR (126 MHz, Benzene-$d_6$) δ147.98 (td, J=16.5, 3.6 Hz), 146.05 (tt, J=11.8, 4.1 Hz), 145.58 (d, J=20.9 Hz), 143.50 (d, J=20.1 Hz), 133.44, 131.39 (q, J=32.6 Hz), 124.24 (q, J=272.7 Hz), 121.78 (t, J=4.0 Hz), 121.45 (q, J=274.4 Hz), 109.38-108.10 (m), 73.75, 23.90. $^{19}$F NMR (376 MHz, Benzene-$d_6$) δ-56.57 (t, J=21.0 Hz), -62.95, -130.60 (dd, J=22.5, 13.2 Hz), -140.71 (qt, J=19.7, 8.6 Hz). $^{11}$B NMR (160 MHz, Benzene-$d_6$) δ 7.22.

The catalyst samples prepared as described above in Reference Example 2 are shown below.

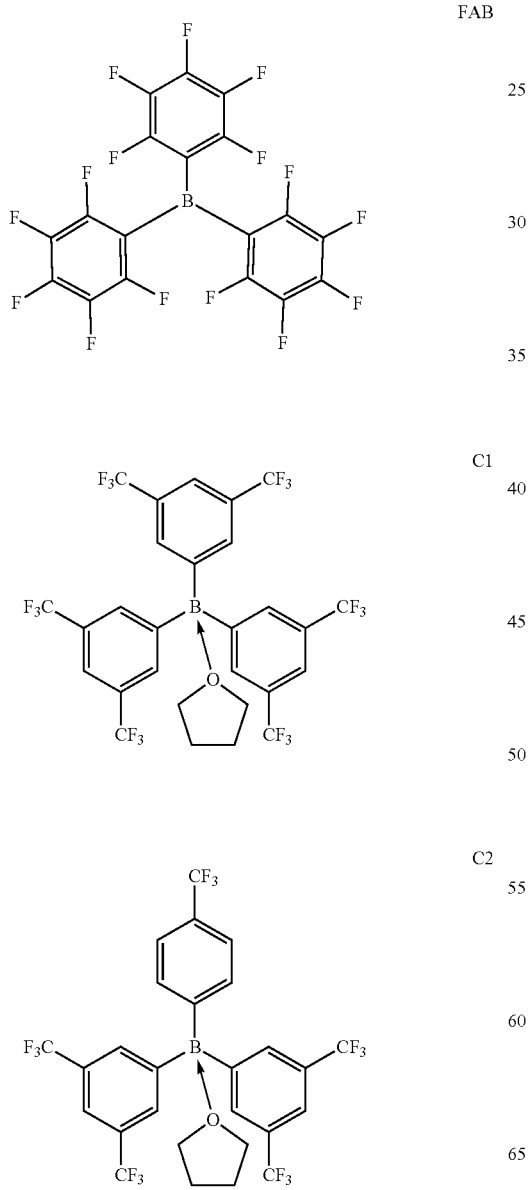

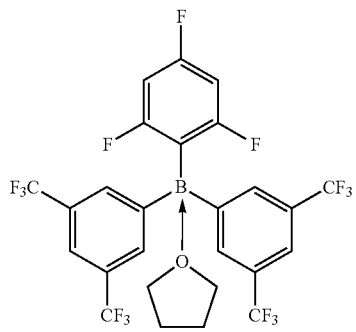

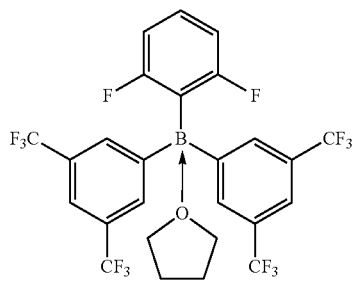

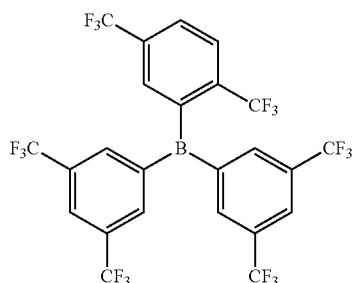

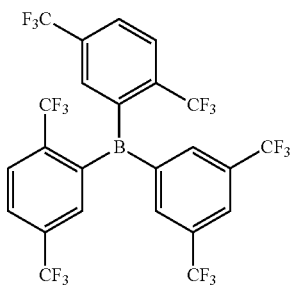

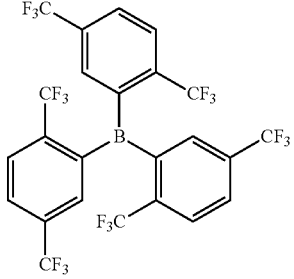

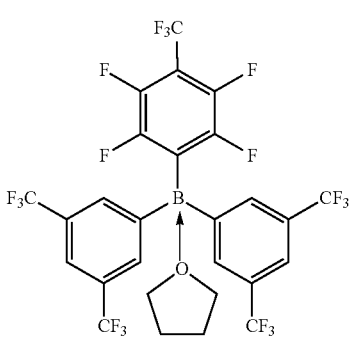

C8

Structures of fluorinated arylborane Lewis acid catalyst samples C1 to C8, and commercially available FAB, are shown above. Structure C1 is tris(3,5-bis(trifluoromethyl)phenyl)borane THF adduct (corresponding to starting material A1) in the claims). Structure C2 is bis(3,5-bis(trifluoromethyl)phenyl)(4-trifluoromethylphenyl)borane THF adduct corresponding to starting material A2) in the claims). Structure C3 is bis(3,5-bis(trifluoromethyl)phenyl)(2,4,6-trifluorophenyl)borane THF adduct (corresponding to starting material A3) in the claims). Structure C4 is bis(3,5-bis(trifluoromethyl)phenyl)(2,6-difluorophenyl)borane THF adduct (corresponding to starting material A4) in the claims). Structure C5 is bis(3,5-bis(trifluoromethyl)phenyl)(2,5-bis(trifluoromethyl)phenyl)borane (corresponding to starting material A5) in the claims). Structure C6 is (3,5-bis(trifluoromethyl)phenyl)bis(2,5-bis(trifluoromethyl)phenyl)borane (corresponding to starting material A6) in the claims). Structure C7, which is comparative, is tris(2,5-bis(trifluoromethyl)phenyl)borane. Structure C8 is bis(3,5-bis(trifluoromethyl)phenyl)(2,3,5,6-tetrafluoro-4-trifluoromethylphenyl)borane THF adduct (corresponding to starting material A7) in the claims).

Reference Example 3—Screening Study

Fluorinated triarylborane Lewis acids prepared as described above were evaluated for SiH coupling in the presence of water as follows. In a nitrogen-purged glovebox, solutions of the fluorinated triarylborane Lewis acid samples shown above were prepared in 10-mL glass vials (ex. FAB, 30.7 mg was dissolved in 5 mL of toluene). The silane (ex: TES, 38.4 µL, 2 equiv.), an internal standard (IS, mesitylene, 16.8 µL, 1 equiv.) were placed in an NMR tube. The catalyst (0.5 mL, 5 mol %) was delivered as a toluene stock solution via pipet. The tube was capped and $^1$H NMR spectra were taken at regular time intervals. Conversion was established in comparison to the internal standard (Si—H bond to IS or Product to IS when possible) after 2 h and 24 h.

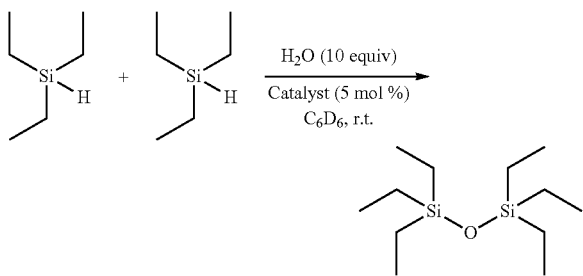

SiH coupling reaction in the presence of water.

TABLE 2

SiH coupling reaction in the presence of water

| Sample | Conversion (%) | |
|---|---|---|
| | 2 h | 24 h |
| FAB | 100 | 100 |
| C1 | 57 | 83 |
| C2 | 50 | 81 |
| C3 | 100 | 100 |
| C4 | 59 | 94 |
| C5 | 78 | 100 |
| C6 | 38 | 51 |
| C7 | 0 | 0 |
| C8 | 100 | 100 |

Without wishing to be bound by theory, it is thought that C7 was too sterically bulky to catalyze the SiH coupling reaction under the conditions tested, and that this demonstrates that not all fluorinated aryl boranes will catalyze the reaction.

Reference Example 4—General Procedure for Preparation of SiH-Containing Polyolefin Copolymers (Copolymer of Ethylene, Octene, and 5-Hexenyldimethylsilane (HDMS) or 7-Octenyldimethylsilane (ODMS Batch reactor polymerizations were conducted in a 2-L Parr batch reactor. The reactor was heated by an electrical heating mantle and was cooled by an internal serpentine cooling coil containing cooling water. Both the reactor and the heating/cooling system were controlled and monitored by a CAMILE TG process computer. The bottom of the reactor was fitted with a dump valve, which empties the reactor contents into a stainless steel dump pot. The dump pot was vented to a 30-gal. blow-down tank, with both the pot and the tank purged with nitrogen. Before use, all solvents used for polymerization or catalyst makeup were run through solvent purification columns to remove any impurities that may affect polymerization. The 1-octene and ISOPAR-E were passed through two columns, the first containing A2 alumina, the second containing Q5 reactant. (ISOPAR-E is an isoparaffin fluid, typically containing less than 1 ppm benzene and less than 1 ppm sulfur, which is commercially available from ExxonMobil Chemical Company.) The ethylene was passed through 2 columns, the first containing A204 alumina and 4Å mol sieves, the second containing Q5 reactant. The $N_2$, used for transfers, was passed through a single column containing A204 alumna, 4Å mol sieves and Q5 reactant.

The desired amount of 5-hexenyldimethylsilane monomer or 7-octenyldimethylsilane monomer was added via shot tank to the load column, followed by ISOPAR-E solvent and/or 1-octene, depending on desired reactor load. The load column was filled to the load set points by use of a lab scale to which the load column is mounted. After liquid feed addition, the reactor was heated up to the polymerization temperature set point. If ethylene was used, it was added to the reactor when the reactor was at reaction temperature to maintain the reaction pressure set point. Ethylene addition amounts were monitored by a micro-motion flow meter.

The scavenger, MMAO-3A, was handled in an inert atmosphere glove box, drawn into a syringe and pressure-transferred into the catalyst shot tank. This was followed by 3 rinses of toluene, 5 mL each, before being injected into the reactor. The procatalyst and activators were mixed with the appropriate amount of purified toluene to achieve a desired molarity solution. The catalyst and activators were handled in an inert atmosphere glove box, drawn into a syringe and pressure-transferred into the catalyst shot tank. This was followed by 3 rinses of toluene, 5 mL each Immediately after catalyst addition the run timer begins. If ethylene was used, it was then added by the CAMILE to maintain the reaction pressure set point in the reactor. These polymerizations were run for 10 min., then the agitator was stopped and the bottom dump valve was opened to empty reactor contents into the dump pot. The dump pot contents were poured into trays placed in a lab hood where the solvent was evaporated off overnight. The trays containing the remaining polymer were then transferred to a vacuum oven, where they were heated up to 140° C. under vacuum to remove any remaining solvent. After the trays cooled to ambient temperature, the polymers were weighed for yield/efficiencies and submitted for polymer testing.

Copolymer samples were prepared following the batch reactor process using the following conditions: for the first copolymer in Table 3, 120° C., 12 g of ethylene loaded, 3.5 mL of 5-hexenyldimethylsilane, 52 g of 1-octene, 588 g of ISOPAR E, 20 µmol of MMAO-3A, 1.2 eq. of bis(hydrogenated tallow alkyl)methylammonium tetrakis(pentafluorophenyl)borate to 1.0 eq. of procatalyst; for the second copolymer in Table 3, 120° C., 12 g of ethylene loaded, 4 mL of 7-octenyldimethylsilane, 58 g of 1-octene, 596 g of ISOPAR-E, 20 µmol of MMAO-3A, 1.2 eq. of bis(hydrogenated tallow alkyl)methylammonium tetrakis(pentafluorophenyl)borate to 1.0 eq. of procatalyst; and for the third copolymer in Table 3, 120° C., 12 g of ethylene loaded, 4 mL of 7-octenyldimethylsilane, 58 g of 1-octene, 592 g of ISOPAR-E, 20 µmol of MMAO-3A, 1.2 eq. of bis(hydrogenated tallow alkyl)methylammonium tetrakis(pentafluorophenyl)borate to 1.0 eq. of procatalyst. The amount of procatalyst used was adjusted to reach a desired efficiency. The reactor pressure and temperature were kept constant by feeding ethylene during the polymerization and cooling the reactor as needed. The polymerization was run to 23 g of ethylene uptake. All polymerizations were performed with bis(hydrogenated tallow alkyl)methylammonium tetrakis (pentafluorophenyl)borate as the activator and MMAO as the scavenger. Properties for the silicone-polyolefin copolymers (elastomers) are shown in Table 3.

in Reference Example 4. Tris(pentafluorophenyl)borane (FAB), which was commercially available, was used as a control.

Solutions of these fluorinated triarylborane Lewis acids (boranes) were made by first weighing solid boranes in a glovebox under a nitrogen atmosphere. The boranes were then removed from the glovebox and mixed with known masses of toluene to make solutions that could be blended into molten copolymers. Care was taken to limit exposure time to air prior to solution creation, and toluene dried over molecular sieves was used as a solvent. All testing of catalyst-laden elastomer samples was initiated within 48 hours of removing catalyst samples from nitrogen atmosphere to limit air or moisture contamination. Solutions of C4, C5, C6, and C7 were added to a melt-blending process such that the loading of each borane was 100 ppm. Melt blending was conducted using a Haake blender with a 20-g bowl, with the temperature set to 80° C., using a blending rate of 60 rpm. 10 g of an elastomer described in Table 3 was blended for 3 minutes until adequately melted, after which 100 µL of borane solution was added. The system was allowed to blend for another 3 minutes until well homogenized, after which the resulting catalyst-laden elastomer was removed and allowed to cool. There was no visual evidence of premature crosslinking of the elastomer during melt blending with C4, C5, C6, and C7 solutions. Premature crosslinking was visually observed when using FAB solutions in the same process.

The resulting catalyst-laden elastomer was then compression-molded into torsion bars (2 mm thick) by compression molding at 90° C. for 4 minutes at 20,000 lbs force. These torsion bars were then moisture-cured by exposure to a humid environment controlled to 85° C., 85% relative humidity or 25° C., 85% relative humidity. Bars were removed from the humid environment after either 1 day or 5 days to give some idea of the kinetics of the moisture-cure reaction. After a bar was removed from the humid environment for testing, it was discarded and not used for further testing.

Reference Example 6—Analysis of Samples

Torsion bars were tested via dynamic mechanical analysis (DMA) using an ARES rheometer. Samples were fixed into the instrument and were exposed to a temperature sweep from 25° C. to 250° C., temperature ramp of 2° C./min, 1%

TABLE 3

Silicone-polyolefin copolymer (elastomer) information

| Mn (g/mol) | Mw (g/mol) | PDI | Comonomer | Ethylene mol % | Octene mol % | HDMS mol % | ODMS mol % | SiH/Chain |
|---|---|---|---|---|---|---|---|---|
| 59668 | 150527 | 2.52 | Octene | 81.43 | 17.97 | 0.60 | 0 | 8.15 |
| 75851 | 195100 | 2.57 | Octene | 85.31 | 14.25 | 0 | 0.44 | 8.22 |
| 84597 | 192978 | 2.28 | Octene | 85.05 | 14.51 | 0 | 0.44 | 9.12 |

Reference Example 5—Crosslinking Study with SiH Functional Polyolefin Copolymer

Samples of fluorinated triarylborane Lewis acids C4, C5, C6, and C7 prepared as described above were selected to determine their feasibility to catalyze reaction of the silicon-bonded hydrogen atoms in a copolymer of ethylene, 1-octene, and either HDMS or ODMS prepared as described strain. Moisture-cured crosslinking was monitored by evidence of a temperature-insensitive storage modulus plateau.

The DMA shear storage modulus of the sample containing the C4 borane with 1 day of moisture exposure at 85° C. decreased monotonically with temperature, dropping to approximately $10^2$ Pa at 250° C., indicating minimal crosslinking had occurred during exposure. The DMA shear storage modulus of the sample after 5 days of moisture exposure decreased with temperature until the sample reached approximately 160° C. The sample then showed a shear storage modulus plateau of approximately $10^4$ Pa, indicating a crosslinked network had formed, preventing further melting of the sample with increasing temperature. This test demonstrated the efficacy of the C4 borane for use as a latent condensation catalyst in a polymer system.

The DMA shear storage modulus of the sample containing the C5 borane with 1 day of moisture exposure at 85° C. decreased monotonically with temperature, dropping to approximately $10^4$ Pa at 250° C., indicating minimal crosslinking had occurred during exposure. The DMA shear storage modulus of the sample after 5 days of moisture exposure decreased with temperature until the sample reached 170° C.

The sample then showed a shear storage modulus plateau of approximately $10^4$ Pa, indicating some crosslinking had occurred, preventing further melting of the sample with increasing temperature. This test demonstrated the efficacy of the C5 borane for use as a latent condensation catalyst in a polymer system.

The DMA shear storage modulus of the sample containing the C6 borane with 1 day of moisture exposure at 85° C. decreased monotonically with temperature, dropping to approximately $10^3$ Pa at 250° C., indicating minimal crosslinking had occurred during exposure. The DMA shear storage modulus of the sample after 5 days of moisture exposure decreased with temperature until the sample reached approximately 160° C. The sample then showed a shear storage modulus plateau of approximately $10^4$ Pa, indicating a crosslinked network had formed, preventing further melting of the sample with increasing temperature. This test demonstrated the efficacy of the C6 borane for use as a latent condensation catalyst in a polymer system.

The DMA shear storage modulus of the sample containing the C5 borane with 1 day and 5 days of moisture exposure at 25° C. decreased monotonically with temperature, and the extent of the decrease was the same as that for the sample without any moisture treatment, indicating minimal crosslinking had occurred during moisture exposure at 25° C. By comparison with the test of C5-containing samples with moisture exposure at 85° C., this test demonstrated that heating is necessary for C5 as a latent condensation catalyst to effectively cure a polymer system.

The DMA shear storage modulus of the sample containing the C7 with 1 day and 5 days of moisture exposure at both 25° C. and 85° C. decreased monotonically with temperature, and the extent of the decrease was the same as that for the sample without any moisture treatment, indicating minimal crosslinking had occurred during moisture exposure at 25° C. and 85° C. The two tests demonstrated that C7 did not act sufficiently as a catalyst both below and above the melting point of the polymer system under the conditions tested.

Torsion bars were analyzed using ATR FT-IR spectroscopy at the time points of interest to monitor formation of Si—O—Si bonds and loss of Si—H bonds. Characteristic vibrational frequencies that were monitored for this study are summarized in Table 4.

TABLE 4

Characteristic vibrational frequencies of Si—H and Si—O—Si groups

| Functional Group | Frequency (cm$^{-1}$) |
|---|---|
| Si—H | 890, 2080-2280 |
| Si—O—Si | 1000-1130 |

Spectra for the boranes analyzed (C4 and C5) showed a gradual increase in the siloxane peak region (1000-1130 cm$^{-1}$) as a function of time. The two peaks associated with Si—H vibrations (890 cm$^{-1}$ and 2080-2280 cm$^{-1}$) also diminished at longer times, which indicated loss of Si—H bonds. The combination of these observations led to the conclusion that at least some of the Si—H groups reacted to give siloxane bonds (Si—O—Si linkages). Additional side reactions may have occurred, evidenced by the emergence of unexpected peaks in both cases at about 1710 cm$^{-1}$. It was also observed that there was still substantial unreacted Si—H content in the system, which could either continue to react over longer periods of time, or be too immobile in the partially crosslinked matrix to have the mobility to complete the crosslinking reaction with other unreacted Si—H groups. Additional loadings of these boranes were not tested, however it is hypothesized that higher loadings would lead to more complete utilization of the Si—H content of the copolymer and a greater corresponding crosslink density.

These boranes present a practical controllable route to enable moisture cure of Si—H containing copolymers. FTIR spectra revealed little change of the SiH peak in the C7 sample over time, which was agreement with the model system study where C7 did not catalyze any conversion of SiH under the conditions tested.

INDUSTRIAL APPLICABILITY

As demonstrated in the examples shown above, when starting material B) comprises a silyl hydride functional polyolefin, starting materials A) and B) can be combined, e.g., mixed, and do not cure unless and until they are exposed to water. That a silyl hydride (SiH functional material) and catalyst can be combined and stored before use/cure is an unexpected benefit of the composition and method described herein.

Problem to be Solved

The catalysts predominantly employed in the preparation of both siloxane intermediates and siloxane-cured networks from Si—H functional silanes and siloxanes are platinum-based catalysts, which have certain drawbacks, described above. An emerging alternative to Pt-based catalysts is the use of tris(pentafluorophenyl)borane ($B(C_6F_5)_3$), referred to herein as FAB. FAB is relatively low-cost, does not contain heavy metals, and has low levels required for catalysis. The use of FAB as a catalyst has been reported in reactions between the Si—H functionality and another functionality useful in curable siloxane compositions or as intermediates. These functionalities include alkoxysilyl functionalities (≡Si—OR) and silanols (≡Si—OH).

In the case of FAB-catalyzed coupling reactions between ≡Si—H and ≡Si—OR, or between ≡Si—H and ≡Si—OH, one major limitation for commercial applications is that the reaction is highly exothermic and occurs very rapidly at room temperature. In the context of large-scale manufacturing of siloxanes, this is problematic because of 1) rapid generation of flammable gas and 2) rapid heating of the reaction mixture. Those factors combined make commercial-scale practice difficult to control, and make proper reaction feed/mixing and monitoring difficult, which can lead to poor reproducibility.

There is an industry need for alternative catalysts, which can promote a reaction between two Si—H moieties in the presence of water in a more controlled manner than FAB. It would be especially desirable to have the ability to control that rate based on the choice of catalysts.

Solution

The composition and method described herein employ fluorinated triarylborane Lewis acids as catalysts. These fluorinated triarylborane Lewis acids provide better reaction rate control than FAB.

Definitions and Usage of Terms

Abbreviations used in the specification have the definitions in Table 5, below.

TABLE 5

| Abbreviations | |
|---|---|
| Abbreviation | Definition |
| ° C. | Degrees Celsius |
| cP | centipoise |
| FTIR | Fourier Transform Infrared |
| g | Grams |
| GPC | gel permeation chromatography |
| Me | Methyl |
| mL | Milliliters |
| mmol | Millimoles |
| Mn | number average molecular weight as measured by GPC as described in Reference Example 2 |
| Mp | Peak molecular weight as measured by GPC as described in Reference Example 2 |
| Mw | weight average molecular weight |
| NMR | nuclear magnetic resonance |
| PDI | Polydispersity index |
| Ph | phenyl |
| ppm | parts per million |
| PTFE | polytetrafluoroethylene |
| RH | relative humidity |
| RT | room temperature of 25° C. ± 5° C. |
| s | seconds |
| SiH content | hydrogen, as silicon-bonded hydrogen, as measured by 29Si NMR |
| THF | tetrahydrofuran |
| µL | microliter |
| µmol | Micromole |
| Vi | Vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

The invention claimed is:

1. A composition for silyl hydride reaction, wherein the composition comprises:
    A) a fluorinated triarylborane Lewis acid selected from the group consisting of:
        A1) tris(3,5-bis(trifluoromethyl)phenyl)borane THF adduct;
        A2) bis(3,5-bis(trifluoromethyl)phenyl)(4-trifluoromethylphenyl)borane THF adduct;
        A3) bis(3,5-bis(trifluoromethyl)phenyl)(2,4,6-trifluorophenyl)borane THF adduct;
        A4) bis(3,5-bis(trifluoromethyl)phenyl)(2,6-difluorophenyl)borane THF adduct;
        A5) bis(3,5-bis(trifluoromethyl)phenyl)(2,5-bis(trifluoromethyl)phenyl)borane;
        A6) (3,5-bis(trifluoromethyl)phenyl)bis(2,5-bis(trifluoromethyl)phenyl)borane;
        A7) bis(3,5-bis(trifluoromethyl)phenyl)(2,3,5,6-tetrafluoro-4-trifluoromethylphenyl)borane THF adduct; and
        A8) a combination of two or more of A1) to A7); and
    B) a silyl hydride having at least one silicon-bonded hydrogen atom per molecule.

2. The composition of claim 1, where starting material A) is selected from the group consisting of:
    A4) bis(3,5-bis(trifluoromethyl)phenyl)(2,6-difluorophenyl)borane THF adduct;
    A5) bis(3,5-bis(trifluoromethyl)phenyl)(2,5-bis(trifluoromethyl)phenyl)borane; and
    A6) (3,5-bis(trifluoromethyl)phenyl)bis(2,5-bis(trifluoromethyl)phenyl)borane.

3. The composition of claim 1, where B) the silyl hydride is selected from the group consisting of:
    B1) a silane of formula $H_k SiR^5_{(4-k)}$, where each $R^5$ is independently selected from the group consisting of a monovalent hydrocarbon group and a monovalent halogenated hydrocarbon group, and subscript k is 1 to 3;
    B2) a polyorganohydrogensiloxane comprising two or more siloxane units selected from the group consisting of $HR^4_2SiO_{1/2}$, $R^4_3SiO^{1/2}$, $HR^4SiO_{2/2}$, $R^4_2SiO_{2/2}$, $R^4SiO_{3/2}$, $HSiO_{3/2}$ and $SiO_{4/2}$, where each $R^4$ is an independently selected monovalent hydrocarbon group, which is free of aliphatic unsaturation; and B3) a polyolefin having a silicon-bonded hydrogen functional group of formula (B3-1):

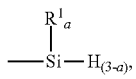

where each $R^1$ is an independently selected monovalent hydrocarbon group and each subscript a is independently 1 or 2.

4. The composition of claim 3, where
starting material B1) is a silane of formula $HSiR^5_3$, where each $R^5$ is an alkyl group of 1 to 6 carbon atoms;
starting material B2) is a polydiorganohydrogensiloxane of unit formula: $(HR^4_2SiO_{1/2})_g(R^4_3SiO_{1/2})_h(R^4_2SiO_{2/2})(HR^4SiO_{2/2})_j$, where $R^4$ is as described above, and subscripts g, h, i, and j have values such that g≥0, h≥0, a quantity (g+h) has an average value of 2, i≥0, j≥0, and a quantity (g+j)≥1, and a quantity (i+j) ranges from 0 to 1000; and
starting material B3) is an SiH-functional polyolefin selected from the group consisting of unit formula (B3-2):

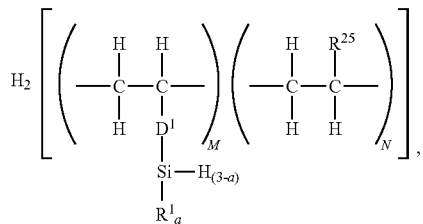

where $R^1$ and subscript a are as described above, each $D^1$ is independently a divalent hydrocarbon group of 2 to 50 carbon atoms, each $R^{25}$ is independently H, a monovalent hydrocarbon group of 1 to 18 carbon atoms or a monovalent halogenated hydrocarbon group of 1 to 18 carbon atoms, and subscripts M and N have values such that 1≤M≤10, and 10≤N≤20,000,
unit formula (B3-3):

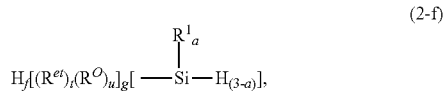

where subscript a and $R^1$ are as described above, subscript f is 0 or 1, subscripts t and u are fractions with relative values such that 0<t≤1, 0≤u≤1, subscript g is 1 or more, each $R^{et}$ represents an ethylene unit, and each $R^O$ represents an olefin unit other than ethylene; and
unit formula (B3-4):

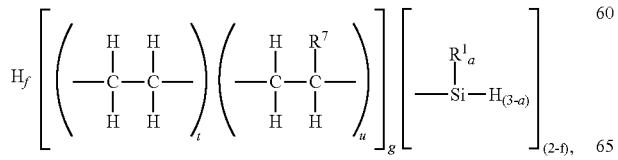

where subscripts a, f, g, t, and u, and $R^1$ are as described above; and each $R^7$ is independently a monovalent hydrocarbon group of 1 to 20 carbon atoms.

5. A method for forming product with a siloxane bond, the method comprising:
1. Combining starting materials comprising
A) a fluorinated triarylborane Lewis acid selected from the group consisting of:
A1) tris(3,5-bis(trifluoromethyl)phenyl)borane THF adduct;
A2) bis(3,5-bis(trifluoromethyl)phenyl)(4-trifluoromethylphenyl)borane THF adduct;
A3) bis(3,5-bis(trifluoromethyl)phenyl)(2,4,6-trifluorophenyl)borane THF adduct;
A4) bis(3,5-bis(trifluoromethyl)phenyl)(2,6-difluorophenyl)borane THF adduct;
A5) bis(3,5-bis(trifluoromethyl)phenyl)(2,5-bis(trifluoromethyl)phenyl)borane;
A6) (3,5-bis(trifluoromethyl)phenyl)bis(2,5-bis(trifluoromethyl)phenyl)borane;
A7) bis(3,5-bis(trifluoromethyl)phenyl)(2,3,5,6-tetrafluoro-4-trifluoromethylphenyl)borane THF adduct; and
A8) a combination of two or more of A1) to A7);
B) a silyl hydride having at least one silicon-bonded hydrogen atom per molecule, and
C) water;
thereby reacting the silicon-bonded hydrogen atom to form the siloxane bond and a by-product comprising hydrogen.

6. The method of claim 5, where starting material A) is selected from the group consisting of:
A4) bis(3,5-bis(trifluoromethyl)phenyl)(2,6-difluorophenyl)borane THF adduct;
A5) bis(3,5-bis(trifluoromethyl)phenyl)(2,5-bis(trifluoromethyl)phenyl)borane; and
A6) (3,5-bis(trifluoromethyl)phenyl)bis(2,5-bis(trifluoromethyl)phenyl)borane.

7. The method of claim 5, where B) the silyl hydride is selected from the group consisting of:
B1) a silane of formula $H_kSiR^5_{(4-k)}$, where each $R^5$ is independently selected from the group consisting of a monovalent hydrocarbon group and a monovalent halogenated hydrocarbon group, and subscript k is 1 to 3;
B2) a polyorganohydrogensiloxane comprising two or more siloxane units selected from the group consisting of $HR^4_2SiO_{1/2}$, $R^4_3SiO_{1/2}$, $HR^4SiO_{2/2}$, $R^4_2SiO_{2/2}$, $R^4SiO_{3/2}$, $HSiO_{3/2}$ and $SiO_{4/2}$, where each $R^4$ is an independently selected monovalent hydrocarbon group, which is free of aliphatic unsaturation; and
B3) a polyolefin having a silicon-bonded hydrogen functional group of formula (B3-1):

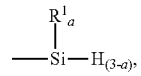

where each $R^1$ is an independently selected monovalent hydrocarbon group and each subscript a is independently 1 or 2.

8. The method of claim 7, where:
starting material B1) is a silane of formula $HSiR^5_3$, where each $R^5$ is an alkyl group of 1 to 6 carbon atoms;
starting material B2) is a polydiorganohydrogensiloxane of unit formula: $(HR^4_2SiO_{1/2})_g(R^4_3SiO_{1/2})_h(R^4_2SiO_{2/2})$ ($HR^4SiO_{2/2})_j$, where $R^4$ is as described above, and subscripts g, h, i, and j have values such that g≥0, h≥0, a quantity (g+h) has an average value of 2, i≥0, j≥0, and a quantity (g+j)≥1, and a quantity (i+j) ranges from 0 to 1000; and starting material B3) is an SiH-functional polyolefin copolymer selected from the group consisting of unit formula (B3-2):

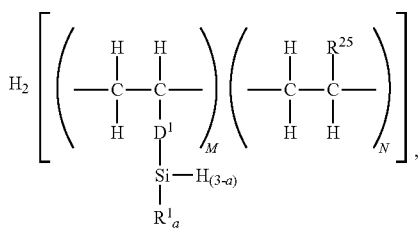

where $R^1$ and subscript a are as described above, each $R^{25}$ is independently H, a monovalent hydrocarbon group of 1 to 18 carbon atoms or a monovalent halogenated hydrocarbon group of 1 to 18 carbon atoms, 1≤M≤10, and 10≤N≤20,000;

unit formula (B3-3):

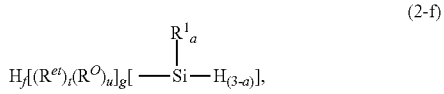

where subscript a and $R^1$ are as described above, subscript f is 0 to 1, subscripts t and u have relative values such that 0<t≤1, 0≤u≤1, subscript g is 1 or more, each $R^{et}$ represents an ethylene unit, and each $R^O$ represents an olefin unit, other than ethylene; and unit formula (B3-4):

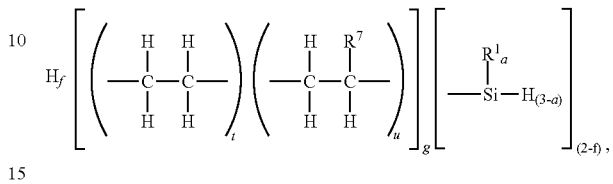

where subscripts a, f, g, t, and u, and $R^1$ are as described above, and each $R^7$ is independently a monovalent hydrocarbon group of 1 to 20 carbon atoms.

9. The method of claim 5, where combining in step 1) comprises mixing and heating starting materials A), B), and C) in any order.

10. The method of claim 5, where starting material A) is dissolved in a solvent before step 1).

11. The method of claim 5, where starting materials A) and B) are combined before step 1).

12. The method of claim 5, further comprising: neutralizing residual fluorinated triarylborane Lewis acid in the product.

13. The method of claim 5, further comprising: during and/or after step 1), removing the by-product comprising $H_2$.

* * * * *